(12) United States Patent
Saulys et al.

(10) Patent No.: US 11,526,524 B1
(45) Date of Patent: Dec. 13, 2022

(54) FRAMEWORK FOR CUSTOM TIME SERIES ANALYSIS WITH LARGE-SCALE DATASETS

(71) Applicant: Amazon Technologies, Inc., Seattle, WA (US)

(72) Inventors: Vincent Vytautus Saulys, Hoboken, NJ (US); Steve Vyacheslav Yalovitser, New York, NY (US); Piyush Khandelwal, Jersey City, NJ (US); Timothy Alan Griesbach, Mount Airy, MD (US); Saman Michael Far, Jersey City, NJ (US); Richard Hsu, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/215,893

(22) Filed: Mar. 29, 2021

(51) Int. Cl.
*G06F 16/24* (2019.01)
*G06F 16/2458* (2019.01)
*G06F 8/60* (2018.01)
*G06F 16/9538* (2019.01)
*G06F 16/9537* (2019.01)

(52) U.S. Cl.
CPC ............ *G06F 16/2474* (2019.01); *G06F 8/60* (2013.01); *G06F 16/9537* (2019.01); *G06F 16/9538* (2019.01)

(58) Field of Classification Search
CPC ............ G06F 16/2474; G06F 16/9537; G06F 16/9538
See application file for complete search history.

(56) References Cited

U.S. PATENT DOCUMENTS

| 2021/0045676 A1* | 2/2021 | Lee | A61B 5/7267 |
| 2021/0217516 A1* | 7/2021 | Nash | G16H 20/00 |

* cited by examiner

*Primary Examiner* — Baoquoc N To
(74) *Attorney, Agent, or Firm* — Nicholson De Vos Webster & Elliott, LLP

(57) ABSTRACT

Techniques for custom time series analysis with large-scale datasets are described. A time series data analysis service provides an interactive development environment that is configured to accept user input to configure stages of a time series analysis data pipeline. The stages include one or more of a collection stage to place events from a dataset into groupings of ones of the events, a summary stage to generate a set of summary statistics based on the groupings of events, a fill and filter stage to add or remove summary statistics to or from the set of summary statistics, and/or an analytics stage to apply analytical functions based at least in part on the set of summary statistics. The stages can be executed at least partially in a distributed manner by a cluster of computing instances executing an analytics engine.

20 Claims, 13 Drawing Sheets

Initial Setup

```
from FinSpace_cluster_management.FinSpace_cluster_manager import
FinSpaceClusterManager finspace_clusters = FinspaceClusterManager()
finspace_clusters.auto_connect("Medium")
```
~ 400

Select Dataset and View

```
dataset_id = 'bu45a81'
view_id = 'iLtFdPAg0n4NXX7QowQUew'
```
~ 405

Get the Data
Using the given dataset and view IDs, get the view as a Spark DataFrame

```
tDF = finspace.read_view_as_spark(dataset_id = dataset_id,
view_id = view_id)\
        .filter(F.col('timestamp').between('09:30:00.00000000',
'16:00:00.00000000'))

tDF.printSchema()
```
~ 415

```
FloatProgress(value=0.0, bar_style='info', description='Progress:
', layout=Layout(height='25px', width='50%'), .
root
 |-- timestamp: string (nullable = true)
 |-- eventtype: string (nullable = true)
 |-- ticker: string (nullable = true)
 |-- price: double (nullable = true)
 |-- quantity: long (nullable = true)
 |-- exchange: string (nullable = true)
 |-- conditions: string (nullable = true)
 |-- datetime: timestamp (nullable = true)
 |-- date: date (nullable = true)
```
~ 420

*FIG. 4*

FRAMEWORK STAGE: COLLECT BARS

Collect raw TAQ events into time bars using FinSpace time series functions or your own custom functions.

```
# specify time-bar, column for time, and how much time to collect
timebar_spec = TimeBarSpec(timestamp_column='datetime',
window_duration=barWidth, slide_duration = barWidth)

# specify what columns to collect in the bar
bar_input_spec = BarInputSpec('activity', 'datetime', 'timestamp',
'price', 'quantity', 'exchange', 'conditions')

# specify the timebar column name
timebar_col = 'window' create time bars, yielding a new DataFrame, add column for num.
of activity items collected in bar
collDF = create_time_bars(data = tDF,
         timebar_column = timebar_col,
         grouping_col_list = ['date', 'ticker', 'eventtype'],
         input_spec = bar_input_spec,
         timebar_spec = timebar_spec)\
    .withColumn('activity_count', F.size( F.col('activity') ) )
```

500

| TICKER | EVENTTYPE | WINDOW | ACTIVITY COUNT |
|---|---|---|---|
| AMZN | TRADE | [2019-10-01 09:30:00, 2019-10-01 09:31:00] | 621 |
| AMZN | TRADE | [2019-10-01 09:31:00, 2019-10-01 09:32:00] | 451 |
| AMZN | TRADE | [2019-10-01 09:32:00, 2019-10-01 09:33:00] | 517 |
| AMZN | TRADE | [2019-10-01 09:33:00, 2019-10-01 09:34:00] | 1373 |
| AMZN | TRADE | [2019-10-01 09:34:00, 2019-10-01 09:35:00] | 911 | only showing top 5 rows...

FRAMEWORK STAGE: SUMMARIZE BARS

Summarize the bars and once summarized, drop activity as it will no longer be needed.

```
# Bar data is in a column that is a list of structs named 'activity'
values collected in 'activity': datetime, timestamp, price, quantity, exchange, conditions sumDF = ( collDF
    .withColumn( 'std',     std('activity.price') )
    .withColumn( 'vwap',    vwap('activity.price', 'activity.quantity') )
    .withColumn( 'ohlc',    ohlc_func('activity.datetime', 'activity.price') )
    .withColumn( 'volume',  total_volume('activity.quantity') )
)
```

600

| TICKER | EVENTTYPE | WINDOW | ACTIVITY COUNT | OHLC | VOLUME | VWAP | STD |
|---|---|---|---|---|---|---|---|
| AMZN | TRADE | [2019-10-01... | 621 | [1747.0, 1747.0, 1743.6, 1743.61] | 38667 | 1745.84 | 0.61145 |
| AMZN | TRADE | [2019-10-01... | 451 | [1743.83, 1746.57, 1743.673, 1745.1057] | 7183 | 1744.99 | 0.56391 |
| AMZN | TRADE | [2019-10-01... | 517 | [1745.44, 1748.88, 1744.0001, 1749.7] | 8635 | 1746.92 | 1.34275 |
| AMZN | TRADE | [2019-10-01... | 1373 | [1747.91, 1753.803, 1747.4601, 1753.47] | 18194 | 1750.74 | 1.54673 |
| AMZN | TRADE | [2019-10-01... | 911 | [1753.18, 1755.5, 1746.0, 1754.29] | 13656 | 1754.27 | 0.71765 | only showing top 5 rows...

FRAMEWORK STAGE: FILL AND/OR FILTER

Using the NYSE Calendar, filter values to NYSE trading days and hours

```
# fill and filter, use the timebar defined in collect stage
ffDF = time_bar_fill_and_filter(sumDF, timebar_col, NYSECalendar20192020(), timebar_spec, start_date,
end_date)

note: times are UTC afteward ttDF.filter( (ffDF.date == start_date) & (ffDF.eventtype == 'TRADE') )\
    .filter( ffDF.ticker == 'AMZN' )\
    .sort( ffDF.window )\
    .select( 'ticker', 'eventtype', 'window', 'activity_count', 'ohlc', 'volume', 'vwap', 'std' )\
    .show(5, False)
```
⟵ 700

| TICKER | EVENTTYPE | WINDOW | ACTIVITY_COUNT | OHLC | VOLUME | VWAP | STD |
|---|---|---|---|---|---|---|---|
| AMZN | TRADE | [2019-10-01... | 621 | [1747.0, 1747.0, 1743.6, 1743.61] | 38667 | 1745.84 | 0.61145 |
| AMZN | TRADE | [2019-10-01... | 451 | [1743.83, 1746.57, 1743.673, 1745.1057] | 7183 | 1744.99 | 0.56391 |
| AMZN | TRADE | [2019-10-01... | 517 | [1745.44, 1748.88, 1744.0001, 1749.7] | 8635 | 1746.92 | 1.34275 |
| AMZN | TRADE | [2019-10-01... | 1373 | [1747.91, 1753.803, 1747.4601, 1753.47] | 18194 | 1750.74 | 1.54673 |
| AMZN | TRADE | [2019-10-01... | 911 | [1753.18, 1755.5, 1746.0, 1754.29] | 13656 | 1754.27 | 0.71765 | only showing top 5 rows...
⟵ 710         ⟵ 720

```
prepDF.filter( (prepDF.date == start_date) & (prepDF.eventtype == 'TRADE') )\
    .filter( prepDF.ticker == 'AMZN' )\
    .sort( prepDF.start )\
    .select( 'ticker', 'eventtype', 'start', 'end', 'activity_count', 'std', 'vwap', 'open', 'high',\
             'low', 'close', 'volume')\
    .show(10, False)
```

*FIG. 7*

FRAMEWORK STAGE: APPLY ANALYTICS

Apply analytics to the data; in this example, calculate Bollinger bands

```
# arguments for functions
tenor = 15
numStd = 2 analytics to calculate
bbandsDef = bollinger_bands(tenor, numStd, 'end', 'vwap', 'high', 'low')

# group the dataset's values by...
pList = ['ticker', 'eventtype']

# prepare the DataFrame
tsDF = compute_analytics_on_features(prepDF, 'bollinger_band', bbandsDef, partition_col_list = pList)

tsDF.printSchema()
```
800

| TICKER | EVENTTYPE | START | END | OPEN | CLOSE | BOLLINGER_BAND |
|---|---|---|---|---|---|---|
| AMZN | TRADE | 09:44:00 | 09:45:00 | 1754.29 | 1753.88 | [1758.13936140, 1751.73298935, 1745.32661730] |
| AMZN | TRADE | 09:45:00 | 09:46:00 | 1754.32 | 1753.80 | [1757.90340022, 1752.33281598, 1746.76223174] |
| AMZN | TRADE | 09:46:00 | 09:47:00 | 1753.99 | 1752.93 | [1756.88210588, 1752.87800211, 1748.87389834] |
| AMZN | TRADE | 09:47:00 | 09:48:00 | 1752.94 | 1752.537 | [1755.54774630, 1753.35348234, 1751.15921838] |
| AMZN | TRADE | 09:48:00 | 09:49:00 | 1754.40 | 1755.0506 | [1755.19158706, 1753.50362509, 1751.81566313] | only showing top 5 rows...

FRAMEWORK FOR CUSTOM TIME SERIES ANALYSIS WITH LARGE-SCALE DATASETS

BACKGROUND

Many companies and other organizations operate computer networks that interconnect numerous computing systems to support their operations, such as where computing systems are co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Many public data center operators, such as service providers who operate service provider networks, offer their customers a variety of resources as services. For example, one popular set of services involve databases or data stores, where customers may utilize various types of databases such as relational databases often used by for transactional applications, non-relational databases for internet-scale applications, data warehouses for analytics, in-memory data stores for caching and/or real-time workloads, graph databases for building applications with highly-connected data, time series databases for measuring changes over time, ledger databases to maintain a complete and verifiable record of transactions, etc.

BRIEF DESCRIPTION OF DRAWINGS

Various embodiments in accordance with the present disclosure will be described with reference to the drawings, in which:

FIG. 4 is a diagram illustrating an exemplary user interface presented to a user via an interactive development notebook for configuring a dataset view according to some embodiments.

FIG. 5 is a diagram illustrating an exemplary user interface presented to a user via an interactive development notebook for configuring a collect bars stage of a time series analysis pipeline according to some embodiments.

FIG. 6 is a diagram illustrating an exemplary user interface presented to a user via an interactive development notebook for configuring a summarize bars stage of a time series analysis pipeline according to some embodiments.

FIG. 7 is a diagram illustrating an exemplary user interface presented to a user via an interactive development notebook for configuring a fill and filter stage of a time series analysis pipeline according to some embodiments.

FIG. 8 is a diagram illustrating an exemplary user interface presented to a user via an interactive development notebook for configuring an analytics stage of a time series analysis pipeline according to some embodiments.

DETAILED DESCRIPTION

Figure 1:
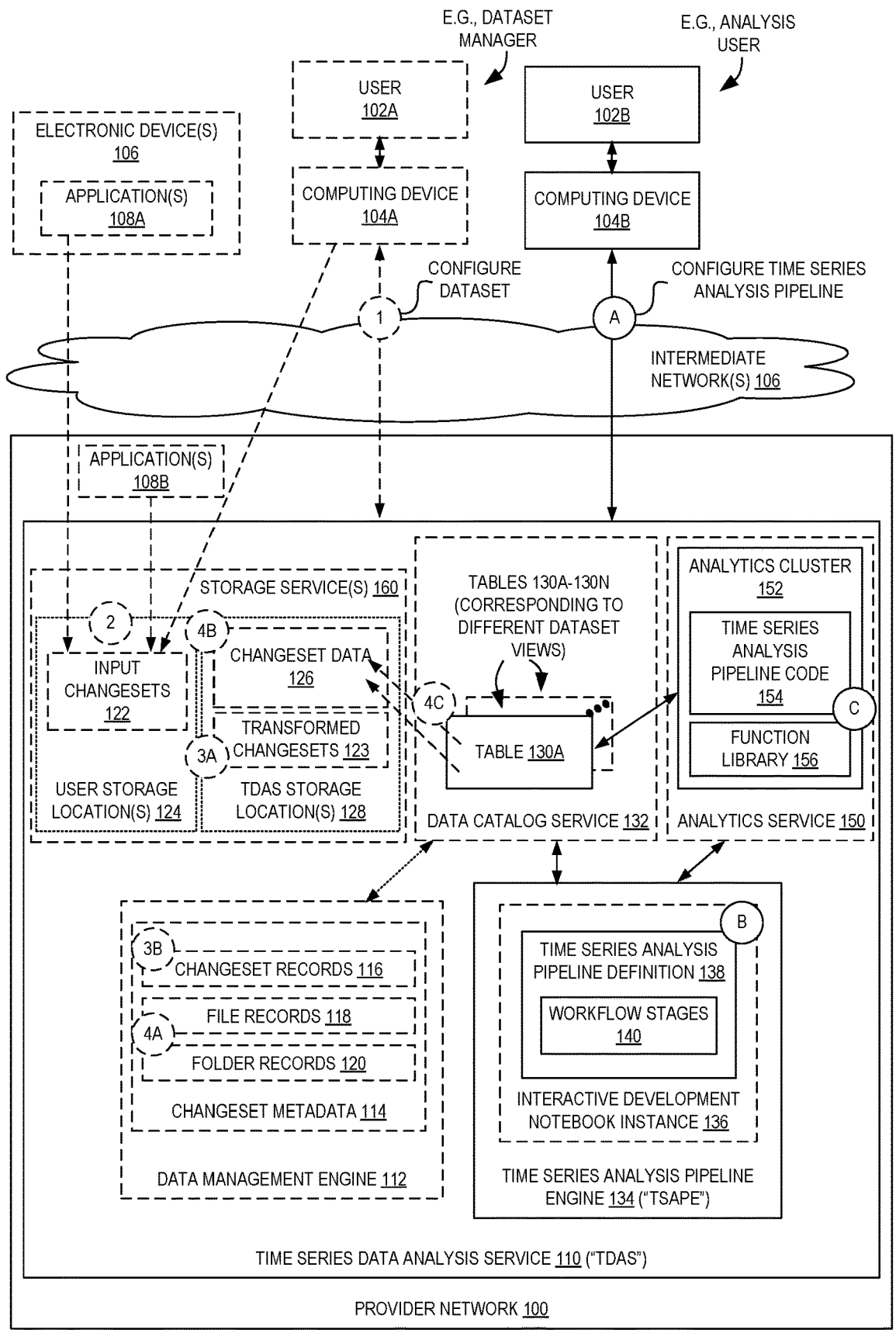
FIG. 1 is a diagram illustrating an environment including a time series data analysis service implementing a framework for user-configurable time series analysis according to some embodiments.

The present disclosure relates to methods, apparatus, systems, and non-transitory computer-readable storage media for custom time series analysis with large-scale datasets. According to some embodiments, a time series data analysis service, or "TDAS," allows users to interactively construct a time series analysis pipeline, such as a pipeline of operations performed for manipulating and analyzing financial data. In some embodiments, the TDAS allows users to search or browse for time series datasets of interest, select a particular desired view of a dataset (e.g., as of a particular point in time), and use this view to configure and utilize a custom multi-stage time series data analysis pipeline using a flexible yet powerful framework. Embodiments can reduce the time needed to find and prepare all types of time series data to be ready for analysis from months to minutes. Further, embodiments can remove the heavy lifting of building and maintaining a data management solution, by allowing users to collect, manage, and catalog data by your relevant organizational/business concepts, such as asset class, risk classification, or geographic region, which makes it easy to discover and share across your organization. Embodiments also provide a library of over many useful functions, such as time bars and realized volatility, to prepare data for analysis, and may also allow users to integrate functions from their own libraries or notebooks for analysis. Embodiments can also support an organization's compliance requirements by ensuring data access controls are enforced and maintaining data access audit logs.

In the field of financial services, time series analysis is a key workflow used by quantitative analysts to extract insights from historical market data and drive decision making Computing historical intra-day correlations between two stocks over a twenty-year period is one example of such an analysis. Such workflows are currently supported through a mixture of human and technological systems and processes that are not at all performant for both small and large datasets, are inflexible to specific user demands or desires, are not well-integrated with other applications or systems, and/or require specialist knowledge and computing architectures. Furthermore, the data required for typical analysis can go into dozens of petabytes and has been growing by several petabytes year over year, driving the need to scale to more compute resources to get timely results. Embodiments described herein address these current challenges and future scaling needs through a unique multi-stage financial time series data pipeline that breaks down the data at each step, reducing size and computational complexity.

Thus, time series analysis is typically performed to extract insights from historical event data to guide business decisions. This kind of analysis is widely used in the financial services industry. One might integrate a number of tools for specialized software solutions, compute capacity, data storage, and databases to carry out time series analysis. The data used in the time series analysis is typically large in size and may contain hundreds of billions of events. For example, the size of historical US Equities TAQ data is approximately 5 TB a year and contains more than 250 billion data events, having increased 300% over the past 5 years. Analyzing such large time series datasets is a challenge because of scaling limits of specialized software solutions, compute, and storage in on-premise environments. These challenges limit the ability to respond to scale with data volume and the need for more analytics. For example, in volatile markets when data volumes grow rapidly and business needs require more analytics than usual, a scale-constrained solution results in a financial disadvantage.

Embodiments disclosed herein provide all the functionality required to perform time series analysis at scale. Time series data can be ingested into the system from sources such as vendor data feeds, on-premises data centers, and/or enterprise data lakes. Via a bi-temporal data management engine of some embodiments, users can track data versions, corrections, and create point-in-time views. In various embodiments, users no longer need specialized hardware or software; users can run analysis from interactive development notebooks (e.g., Jupyter notebooks) integrated with dynamically scalable compute clusters (e.g., Spark clusters). In some embodiments, the framework is delivered as a library with many available time series functions, and users may bring their own functions or use open-source libraries that can be scaled. In some embodiments, there are no constraints on storage or compute, as both can scale dynamically based on the data and computational needs of the user. Accordingly, to begin time series analysis, users may simply add a dataset or choose an existing dataset from a catalog, open it in an interactive development notebook (with a supporting managed cluster), and start using the framework.

As indicated above, generally speaking time-series data involves a sequence of data points organized according to a time order. A time series thus tracks a history of data points, such as a stock's price over time. In finance, time series data is often captured by vendors and quantitative analysts, and most data is made up of events having a corresponding timestamp, which is used to drive decisions to support future investments. For example, there may be an explicit or inherent "as of" time for nearly every market event in finance (e.g., the price of a stock at a particular moment, the time an earnings report is released, etc.).

A financial time series analysis is an analytical process or set of processes acting on historical time-series data that, for example, extracts meaningful insights based on the data or validates or rejects a hypothesis. The most common data used for time series analysis in the financial field is market data, which is fairly high-volume, though there are other types of less-frequent important data also having a related time (e.g., earnings reports, which may be released quarterly).

Historical time-series data is used in various areas of finance. As one example, in trading, if the prices of a basket of stocks have moved together in the past, it can be assumed that they will likely continue to move together again in the future. This assumption can be validated by an analysis of time-series data for the basket of stocks. If this knowledge can be obtained, when the prices of such stocks diverge for a short period of time, as it can be assumed that the prices will again converge, a trader may be able to execute a set of trades to their benefit by using a statistical arbitrage strategy. Moreover, time series analysis can be incredibly useful for a variety of other financial tasks, and even for non-financial tasks, such as by academic or scientific researchers attempting to identify patterns or relationships between various signals or data elements, e.g., the changes in biological data based on the changes of the weather or climate, for example.

Time-series analysis may be done on either dense data, where data events are added every few nanoseconds, or sparse data, which could be daily, monthly, or even yearly. Note however, the categorization of data as being dense or sparse may differ based on the field of use, and thus the terms are more generally used to generally indicate different types of data density.

Time series analysis may thus be done either for a period of a single day, a portion of a single day (or hour, minute, etc.), or even for a period of time going back many decades. As indicated, just within the field of finance this type of analysis is a part of the day-to-day business activities of hedge funds, asset managers, insurance firms, brokers, and banks, and countless other fields and organizations use time series analysis for other tasks.

Typically, for time series analysis, summaries of the data are used, and not "all" the raw data. For example, a common time series dataset is known as end of day (EOD) data, which is a summary of each stock's trading activity by day (e.g., the open price, high price, low price, and close price along with the total number of shares traded - the volume). When dealing with long periods of time, one technique for using this data is to summarize the data in portions and then summarize the summaries of data (e.g., using EOD data, calculate the moving average over a number of days). This has the effect of smoothing values over time and hiding the short-term changes in the data. Thus, this approach involves summarizing multiple periods of time, and then summarizing those summary values.

Many users doing time series analysis wish to use their own collection techniques, for example, a user may want different periods of time to collect and summarize (instead of one minute, perhaps three or five minutes) and/or use other collection techniques (collect events by tick or volume, rather than by simple time windows). To get these datasets today, users would either need to request it from their data vendor (if available, or if the vendor can create the custom data for them) or create it themselves from the raw data. However, either approach requires significant time (and likely, significant expense), such as by users needing to ask data vendors to produce the custom data for them or do the work themselves by purchasing the raw data (TAQ) and generating their custom data therefrom, which is also tremendously error-prone.

Accordingly, users such as quantitative analysts cannot currently "scale" their work to keep up with the number of time series analysis experiments they need to do. They cannot scale because they face challenges in working with granular time series tick data at scale, with the quality of the data that is available, and the lack of availability of data required that is not integrated into their work environment. Thus, quantitative analysts consistently spend a large amount of time working on basic infrastructure tasks, like creating ingestion and ETL (extract, transform, and load) pipelines, implementing job schedulers, installing, configuring, and building out compute and disk resource managers, and developing presentation frameworks. A lot of this basic infrastructure work ranges from developing these components to downloading/integrating them into an existing environment. Further, the analyst may be constantly challenged by their inability to reproduce results, or to reuse existing data and analysis for other tasks and may be further frustrated by the inability to quickly productize experiments and deploy them into production for regular, self-service use.

Embodiments disclosed herein can address these and other problems by providing a powerful, scalable, and customizable framework to perform time series analysis at scale. The framework presents a data pipeline that implements a number of stages that can be used to transform data from raw events, into collections of events (called "bars"), and then to summaries of the bars. Once summaries of bars exist, additional framework components can optionally be applied to filter data (e.g., to remove data from consideration that is not helpful) and/or fill missing data and pivot all of the data into a kernel data set. Finally, in some embodiments the last stage once the data is prepared is to apply one or more analytics-type calculations, which could involve applying one or more of provided technical indicator functions on the data, or even could involve applying an external user-provided function or open-source analytic library to the data. The output of the last stage, in some embodiments, could be another derived time series of calculations, or a summary statistic that provides a meaningful answer to a posed business problem defined at the start of the analysis.

FIG. 1 is a diagram illustrating an environment including a TDAS 110 implementing a framework for user-configurable time series analysis according to some embodiments. In FIG. 1, the TDAS 110 is shown as being implemented in a provider network 100. The TDAS 110, in some embodiments, is implemented by software executed by one or multiple compute instances and/or computing devices, which may be located in a same geographic area (e.g., a same room, data center, city, etc.) or different geographic areas (e.g., in different data centers, cities, regions, countries, or the like). A provider network 100 (or, "cloud" provider network, or often just "cloud") provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service (e.g., storage service 160) that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

Thus, a cloud provider network typically includes a large pool of accessible virtualized computing resources (such as compute, storage, and networking resources, applications, and services). A cloud can provide convenient, on-demand network access to a shared pool of configurable computing resources that can be programmatically provisioned and released in response to customer commands These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a VM that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting a request to perform a set of actions or submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an API call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown, the TDAS 110 includes multiple components, such as a data management engine 112 to manage the storage and availabilities of datasets and a time series analysis pipeline engine 134 (or "TSAPE") to allow users to generate or configure a time series analysis pipeline based on use of dataset views. These components—as well as other shown components or resources such as input changesets 122 or changeset data 126 derived therefrom, tables 130A-130N, analytics clusters 152, etc.—are shown as being part of the TDAS 110, though some or all of these resources may be provided or supported by other services of the provider network 100. For example, the input changesets 122 or changeset data 126 may be stored by a storage service 160 (e.g., an object or file storage service, database, or the like), tables 130A-130N may be provided by a data catalog service 132 (e.g., a managed extract transform load (ETL) service providing data integration functionalities), the analytics clusters 152 may be provided by an analytics service 150 (such as one utilizing Apache Spark, etc., and that allows users to process and/or analyze data for machine learning, scientific simulation, data mining, web indexing, log file analysis, data warehousing, or the like), changeset metadata 114 may be stored by a database service, etc.

As described herein, many individuals need to work with time series data, which can include many raw records (or events) each including one or more values that is associated with a particular date and/or time. One example type of time series data—of many—is found in the financial industry, which may include time series data such as securities data (e.g., stock prices for one or more stocks as of many different points in time), financial reporting data (e.g., reported profits or accounting information over time), exchange rate data, and the like. In many such cases, the amount of data (and records) of such time series datasets may be huge—prices and/or trading volume for hundreds or thousands (or more) of securities may be updated once a second, multiple times a second, or the like.

Moreover, time series datasets also often may need to support the amendment of data. For example, in some financial fields, the amendment of financial data may fall into two classifications: amendments due to system/human error correction, and amendments due to financial or legal events. An example of the first classification may be the incorrect publishing of a quote on an exchange due to trader entry error, whereas an example of the second classification may be a restatement of past financial results of a company due to a change of accounting process or an invalidation of a tax avoidance strategy.

Accordingly, in these environments users typically require both bitemporality as well as historical views of the datasets. Bitemporality refers to the ability to be able to look at different views of the data over a large span of time. In financial trading operations, a bitemporal data management capability means being able to assign and manage multiple values, for a same item, as of different points in time. These can include data about conversion ratios, positions, portfolio holdings, exposure, ratings, or a firm's own classifications of a security or an action. Implementing such bitemporal functionality for time series data is extremely challenging because of the very large amount of data, the schema or lack thereof, and/or the cardinality of the columns (the different potential values of each column of each record). As a result, a naive or straightforward approach to implement support for historical views will either dramatically affect the size of the data stored (e.g., storing independent complete copies of each "version" of a dataset), significantly slow down read operations (e.g., by storing a complex set of pointers to different events belonging to different views), or both. Embodiments disclosed herein provide a general-purpose solution to such problems.

In some embodiments, the TDAS 110 utilizes a concept of a dataset as a container (or collection) of data files that together represent a full recordset for some data. Data may be ingested into a dataset in batches of file(s), which are referred to as changesets. Changesets are atomic and immutable. To query the data in these datasets, users do not interact with "raw" (unprocessed) changesets, but instead interact with data views (also referred to as just "views" or "snapshots") of the dataset. Dataset views are produced, by the TDAS 110, by transforming changesets according to their associated "type" (e.g., append, replace, modify, delete, correction, etc.). Dataset views thus may be made up of the underlying data (e.g., files stored in one or more storage locations) and metadata (e.g., pointers to the file locations, as part of a data catalog table 130 that serves as an index to the data). Embodiments may support one or multiple types of dataset views. One type of dataset view may be referred to as an "autoupdate" (or current) dataset view, and another type of dataset view may be referred to as a "point-in-time" (or, "as-of") dataset view.

In some embodiments, files within a dataset view maintain a relatively "permanent" relationship to the changeset they originated from. For example, when a changeset is deleted or modified, only the metadata may be updated for the dataset view, while the actual files (storing the data) may not get deleted. Thus, in some embodiments, a dataset view may be created by identifying all the changesets that are applicable to a given point in time, transforming them if necessary, and using this collection of files to generate a data structure for the dataset view (e.g., a table), which may include assembling the files in appropriate storage locations and data catalog partitions.

In some embodiments, the creation of a dataset view on demand—by transforming all the applicable raw changesets and/or copying all the transformed files—may be a relatively expensive endeavor in terms of needed time and computing resources, especially when the difference between snapshots is not that large. Thus, in some embodiments the system may utilize an optimization by producing a new dataset view from an existing dataset view by copying and/or deleting only a subset of transformed files, and without having to re-process the actual raw changesets. Thus, embodiments can minimize the amount of data needed to be stored by only maintaining a single copy of each file for autoupdate dataset views.

With the ability to maintain bitemporality and provide current or historic dataset views (as of potentially any point in time), in some embodiments the TDAS 110 can provide access to this data to users for a variety of purposes. As one use case, in some embodiments the TDAS 110 includes a TSAPE 134 to allow users to configure and use a custom data pipeline to process the data in a manner suited to their specific needs.

For example, in some embodiments the TSAPE 134 can provide one or more user interfaces (e.g., through a web-based application) to allow a user to select one or more dataset views of interest (where ones of the datasets may optionally be custom-generated for the user as of a requested point in time) and use an interactive development notebook (or more broadly, an "interactive development environment", which may provide a WebUI or "notebook" experience that is backed by an interactive development notebook instance 136) to create and configure a time series data pipeline definition 138 (made up of one or more user-configured workflow stages 140) to process the data. However, in other embodiments a user may use another application, such as a standard IDE, text editor, or other programming environment to configure a time series data pipeline definition 138. For example, a quantitative analyst may import a number of datasets into a project—e.g., data from variety of sources (news articles, stock quotes, etc.), which may or may not include corrections to that data—and materialize these datasets into one or more dataset views to present a bitemporal view of the data. With these views, which may accommodate any corrections as of various points in time, the quantitative analyst can configure and use a custom time series data pipeline having multiple stages that may, for example, obtain the data, reduce its complexity, and apply a variety of analytics operations to it, which may include the use of desired functions from a custom library of analytics functions that are custom-tailored to the specific pipeline. Upon crafting a suitable pipeline, which may include substantial iterative updates to the pipeline code/ logic by the analyst (where results of the analyst's changes may be in near real-time computed by an associated analytics cluster 152—via the interactive development notebook instance 136, and subsequently presented back to the analyst), the analyst may obtain (or allow another associated user to obtain) results of the analysis, code for the pipeline in the form of a pipeline definition 138 (or downloadable "notebook"), which may include or be accompanied by code for the custom functions, all of which can be used the deploy the pipeline in another environment, e.g., for production purposes. In some embodiments, the user may also cause code for the pipeline to be hosted by the TDAS 110 or another service of the provider network 100 (e.g., as a serverless function, as software executed by a compute instance of a hardware virtualization service, as an analytics application executed by an analytics service, or the like); thus, the user (or other users) may run the pipeline over time, e.g., by issuing requests for its invocation and receiving the results thereafter (e.g., in a response message, stored at a storage location, or the like).

With reference to FIG. 1, then, a user 102A such as a dataset owner or manager, may utilize a computing device 104A to interact with the TDAS 110 (e.g., via one or more interfaces of a web-based application or console, via API calls made by another type of application, etc.) to configure a dataset as shown by circle (1). The information provided by the user (and carried in messages originated by the computing device 104A) during this configuration may vary depending upon the particular implementation, but may include one or more pieces of information such as a name for the dataset, a description of the dataset, ownership information for the dataset (e.g., which user or account owns or manages the data, contact information such as a name, phone number, email address, user alias, mailing address, etc.), a schema for the dataset that identifies column names, type, etc. (which may be provided by the user, or inferred by the TDAS 110 by analyzing some of the dataset and thereafter confirmed/updated by the user), whether particular types of dataset views should be maintained or created (e.g., only a current or "autoupdate" view, both an autoupdate view and a particular point in time view, create point-in-time views every day or week, etc.), a location or locations where input changesets will be provided (and/or already exist) for the dataset, whether (and how) to configure partitions for the datasets/views or columns to sort on, and the like.

Thus, either before this configuration, approximately concurrent with this configuration, or after this configuration (and possibly on a continual or semi-periodic basis) data belonging to the dataset is provided. This may occur, for example, by the user 102A by sending input changesets 122 via the user's computing device 104A (during or after the dataset configuration), and/or by another one or more applications 108A-108B executing within the provider network 100 or outside of the provider network by other electronic devices 106, as represented by circle (2). The input changesets 122 may be stored, for example, in a set of one or more storage locations (e.g., object stores such as "buckets" or "folders" of a storage service) owned or controlled by the user, or even directly provided to the TDAS 110 (and then stored in a storage location 128). In this manner, the data may be flexibly provided from a variety of sources in a variety of manners. In some embodiments, the user 102A need not even provide the data, but may select from provided or accessible datasets already available within the TDAS 110 or provider network 100—e.g., financial data made available by another user of the provider network 100.

As indicated, the input changesets 122 may be stored in a user storage location 124 (e.g., a user-controlled object storage location), and the user may grant the TDAS 110 cross-account permissions to access the location in order to access the input changeset(s) 122, e.g., by copying the input changeset(s) 122 to a TDAS-controlled storage location 128. Additionally, or alternatively, the user may simply upload one or more input changeset(s) 122 to the TDAS 110, which are directly stored in the TDAS-controlled storage location 128, bypassing the need for a user storage location 124.

In some embodiments, a user 102A (or application 108A-108B) may send a message (e.g., an API call) to the TDAS 110 when a new set of one or more input changesets 122 are available for processing. The message may include, for example, a storage location identifier (e.g., a URI, URL, storage location identifier, etc.) where the input changeset(s) 122 is located. In other embodiments, the TDAS 110 may simply directly receive the input changesets 122, poll a user storage location 124 to monitor for new input changesets 122, and/or receive an event notification (e.g., from the storage service 160 or another monitoring service of the cloud provider network 100) created upon a new input changeset 122 being stored.

The message, in some embodiments, includes a changeset type associated with the changeset, where a type may be a value indicating how the changeset is to be applied to the dataset. For example, a type of "append" may be used to indicate that the input changesets include new data to be added to the existing data of the dataset. Similarly, a type of "replace" may be used to indicate that all existing data of a dataset is to be replaced with that of the input changeset(s).

Further, a type of "correction" may be used in some embodiments to indicate that one or more particular previous records, columns, values, etc., of the dataset (e.g., from a different changeset) are to be replaced with the updated version of this changeset. Such a changeset may be useful when most data of a dataset view is good, but there may have been an error in a relatively small amount of the data. Thus, instead of completely removing the data and replacing it over again—which may be very expensive in terms of needed resources, or there may not be easy access to all historic data—embodiments can obtain the correction(s) and ingest this corrected data into an existing dataset. Thus, the updated or corrected data (e.g., pertaining to data from 2 weeks ago) will appear in any autoupdate dataset view as well as in any point-in-time dataset views that are after this time of correction; however, the updates purposefully will not appear in static dataset views that are from points earlier in time to this moment. This can be particularly useful in some contexts, such as in the financial world, for managing updates like restatements of earnings. Under this approach, the dataset can exist in the previous (wrong) unaltered form as well as in the correct form, via use "as of" semantics and thus embodiments can reproduce the "at the time" knowledge as of various points of time. Of course, in other embodiments other changeset types may be used for similar or different purposes based on the desires of the implementor.

In some embodiments, the input changesets 122 are processed by the data management engine 112 by transforming them in some manner at circle (3A), e.g., to decompress them (e.g., from a gzip or zip archive), to clean up dirty or missing values (e.g., by replacing empty values with a NULL value), to reformat certain value types (e.g., by converting a date and/or time into a specialized format), to partition the data (e.g., split records within a file into different files based on values of the data—such as based on the date of each entry), to store them in a different format (e.g., in a column-oriented file such as a Parquet file, as opposed to a CSV or other row-oriented format), etc. These "processed" or transformed changesets 123 (as opposed to the "raw" input changesets 122) are stored.

For each changeset, the data management engine 112 may update one or more stores (e.g., databases, files, etc.) of changeset metadata 114. For example, at circle (3B) the data management engine 112 may populate a changeset record 116 identifying information such as a unique changeset identifier (globally unique, unique for the dataset, unique for the user, etc.), a date and/or time of the changeset being created/obtained, a date and/or time (or NULL/empty) if the changeset was deleted, etc.

With a new set of transformed changesets 123, for an existing autoupdate (or current) dataset view, an update process is initiated by the data management engine 112. For example, in some cases, the data management engine 112 may interact with a data catalog service 132 to identify locations where ones of the transformed changesets 123 are to be stored (or portions thereof, in the case of partitioned data) by identifying existing folders for existing partitions (corresponding to data in the changeset) and placing these files in those locations. In other cases, the data management engine 112 may generate a new folder and store changeset files there.

Thus, the data management engine 112 may update a set of one or more file records 118 and/or folder records 120 at circle (4B) to track which files belong to which changeset and which locations (e.g., folders) are used to store these files. A file record 118 may include, for each file belonging to a changeset, an identifier of an associated changeset (e.g., a changeset ID), an identifier of a dataset view that the file pertains to, an identifier of the partition that the file stores records for, an identifier of a filename or file prefix, etc. A folder record 120 may include an identifier of the associated changeset (e.g., a changeset ID), an identifier of a dataset view that the folder pertains to (e.g., if one is being updated/created concurrently), an identifier of the partition that the folder stores records for, and identifier of the folder (or bucket) name, etc. In some embodiments, the placement of particular files of the transformed changeset data (e.g., belonging to particular partitions) may be made based on using ones of these records, though in other embodiments the placement may be made based on interacting with the data catalog service 132. As one example, the data management engine 112 may use the file records 118 and/or folder records 120 to identify a particular folder where changeset data pertaining to a particular date is to be stored and may thus store those files in that folder location.

The data management engine 112 may also interact with a data catalog service 132 at circle (4C) to update the metadata of one or more tables 130A-130N corresponding to the one or more dataset views impacted by the changesets at circle (4C). As described herein, each of the tables 130A-130N may correspond to a particular dataset view and include references to the particular files of changeset data 126 that have the records/data that belong to the table. Thus, these tables 130A-130N may be used, e.g., via a data catalog service 132, by other applications (e.g., an analytics service 150 as one example) to query against these dataset views by interacting with the tables 130A-130N. The structure and usage of such tables 130A-130N—that include metadata as well as references to the underlying data that is stored elsewhere—is known to those of skill in the art and may be similar to the tables offered by the AWS(R) Glue Data Catalog.

For updates of type replace (or delete), the data management engine 112 may simply remove references (or pointers) from the associated tables 130A-130N to underlying data, allowing the data itself to remain, and possibly be referenced by point-in-time dataset views prior to that time.

Thus, embodiments can operate using user-defined batches of data in the form of changesets, where the granularity is defined by the user, and the system need not expect data coming in to have any particular schema, or primary keys, etc. Accordingly, embodiments may replace an entire batch (or changeset), as opposed to a process where updating is to happen on a record-by-record basis. As a result, in some embodiments the data involved doesn't strictly need to have primary keys, and this configuration allows for processing of very large amounts of data through avoiding performing work at the row level through working at the changeset level.

With such datasets, in some embodiments the TDAS 110 via the TSAPE 134 can enable users (e.g., user 102B, via computing device 104B) at circle (A) to browse, search for, and/or explore datasets, create custom dataset views, and utilize dataset views via the configuration of a time series analysis pipeline. For example, in some embodiments the TSAPE 134 provides an interface to allow users to configure a time series data pipeline (e.g., for analytics) using one or more dataset views.

For example, the user 102B may use the computing device 104B to browse or search through a data catalog of datasets that are available to the user—such as public datasets, datasets that this user has created, datasets that another user has created and shared with the user, datasets belonging to an organization that the user is a part of, or the like. Via these interfaces, the user 102B may search for datasets using keywords or other values, view information associated with a dataset (e.g., its schema, its history, its ownership) and/or example data from the dataset, and/or select a dataset view to utilize (or create a new dataset view for use).

Upon selecting one or more dataset views, at circle (A) the user may cause a message to be transmitted to the TSAPE 134 to begin time series analysis pipeline configuration, causing the TSAPE 134 to launch an interactive development notebook instance 136 allowing the user 102B to configure various workflow stages 140 of a time series data pipeline definition 138 at circle (B). The interactive development notebook instance 136 may be a compute instance (e.g., a virtual machine) hosting a server application (e.g., such as a backend server for a Jupyter Notebook, as known to those of skill in the art) providing supporting functionality for a client application executed by a computing device 104B (e.g., a web-based application) that allows the user to prepare and visualize data, collaborate with peers, build applications, and perform interactive analysis.

In some embodiments, the interactive development notebook instance 136 may, upon receipt of an instruction from the client (e.g., executed by the computing device 104B) to perform an operation using a dataset view, send a message to an analytics cluster 152 (of one or more computing instances) to execute the operation via time series analysis pipeline code 154 (and optionally a function library 156 of special-purpose analytics functions) at circle (C). This execution may include the analytics cluster 152 reading data of the involved dataset view via interacting with the corresponding table 130 of the data catalog service 132. Upon generating a result, the analytics cluster 152 can pass it back to the interactive development notebook instance 136, which can return it to the client to be presented to the user 102B.

The analytics service 150, in some embodiments, is implemented using software executed by one or multiple computing devices at one location or multiple locations. In some embodiments, the analytics service 150 may be a cloud "big data" platform allowing users to process vast amounts of data using open-source tools such as Apache Spark, Apache Hive, Apache HBase, Apache Flink, Apache Hudi, etc.

As indicated herein, the analytics service 150 may execute user applications in a distributed manner, e.g., using a large-scale data processing system (e.g., for "big data") such as the Apache Spark (TM) general-purpose distributed data processing engine. Such data processing systems are in widespread use by a variety of types of users and organizations for a wide range of large dataset processing purposes. These systems typically employ a distributed approach to processing data where multiple "executors" work together to perform a set of operations on a dataset, as opposed to the more traditional technique of using one such processing node.

Some data processing systems, such as Spark, allow for other modules to operate "on top" of the underlying core data processing engine, providing libraries for structured query language (SQL) type querying, machine learning, graph computation, stream processing, etc., any or all of which can be used together in an application (e.g., time series analysis pipeline code 154 and/or function library 156). These systems common support applications written in any of multiple different programming languages; e.g., Spark supports Java, Python, Scala, and R. Application developers and data scientists may thus incorporate these systems into their applications to rapidly query, analyze, and transform data at scale, such as for implementing Extract-Transform-Load (ETL) or Structured Query Language (SQL) batch jobs across large data sets, processing of streaming data from sensor devices, Internet-of-Things devices, or financial systems, as well as for machine learning tasks.

Commonly, data processing systems like Spark execute applications using a driver and a set of distributed worker processes, which may be referred to as executors. For example, a Spark driver may run the main()method of an application and create a SparkContext. The driver typically runs on a node in the cluster of worker nodes and schedules the job execution with a resource manager, responds to a user's program or input, analyzes, schedules, and distributes work across the executors, and maintains metadata about the running application.

Spark executors, in contrast, are a distributed process responsible for the execution of tasks. A Spark application has its own set of executors, which stay alive for the life cycle of a single Spark application. Executors perform all the data processing of a Spark job, store results in memory (typically only persisting to disk when specifically instructed by the driver program) and return results to the driver once they have been completed. In many environments, a single worker node (e.g., a virtual machine or container, or even an entire physical host computing device) can implement one or multiple executors—e.g., one executor per node, one executor per core, etc.

Turning back to the TDAS 110, as one example, the user 102B may interact with the TSAPE 134 to configure a financial analytics time series data pipeline definition 138 by exploring and configuring sample code, including use of various functions that are available (e.g., of a set of financial functions of a function library 156), testing other special rules or logic, performing backtesting, plotting and viewing results, etc., until a satisfactory time series data pipeline definition 138 is created. The user 102B may then download (or otherwise copy) a notebook including the pipeline, and/or the time series data pipeline definition 138 code (and optionally download some or all of the function library) and put it into a production workflow, which may utilize provider network 100 resources or the user's own resources (e.g., in a data center of the user's organization, on the user's own computing device, etc.). As another example, the time series data pipeline definition 138 may be used to generate code that is deployed as a scheduled job that is triggered upon new data arriving, such as via use of an on-demand serverless function, as code executed by a compute instance run by a hardware virtualization service, or the like.

Figure 2:
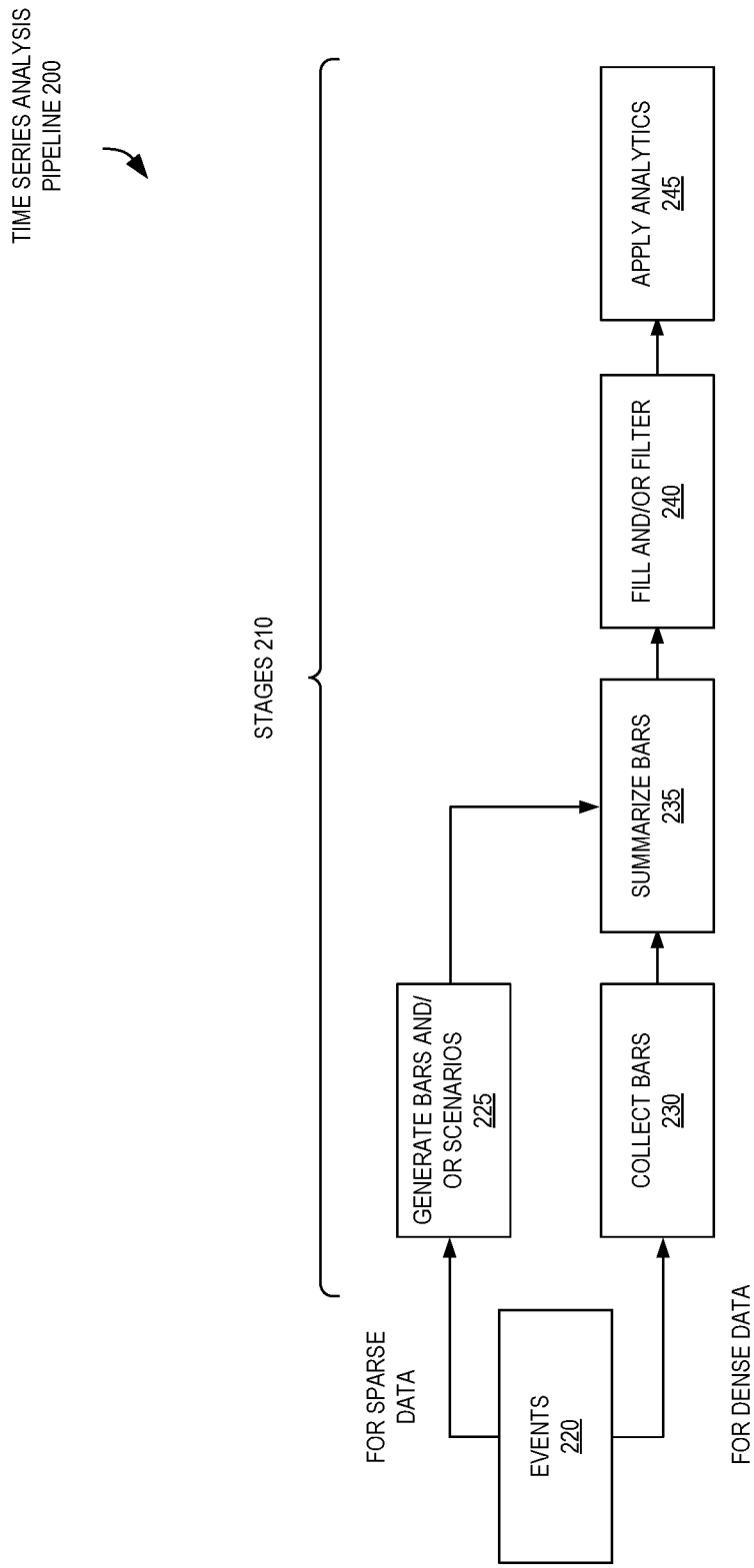
FIG. 2 is a diagram illustrating exemplary stages of a time series data analysis pipeline that can be configured by users according to some embodiments.

FIG. 2 is a diagram illustrating exemplary stages 210 of a time series data analysis pipeline 200 that can be configured by users according to some embodiments. Such a pipeline can be created and customed by a user, using functions of a library of functions provided by the TDPE 134 (and/or user-provided functions) based on one or more dataset views.

In some embodiments, a time series framework defines a set of stages to transform data from raw time series data events to the computation of finance-specific analytics like technical indicators. The time series functions may be used in different stages. Each stage accepts inputs from the previous stage and generates outputs that act as an input to the next stage. Users may also, in some embodiments, slot their own functions at any stage. Moreover, the path through the stages of pipeline can change depending on the input time series data events being dense or sparse.

For example, in some embodiments a density criterium (or threshold) may be configured by the system (or by the user) to determine whether a dataset is dense or sparse. As one example, samples of events from the dataset may be obtained and analyzed; if at least some threshold number of events occur within a threshold amount of time windows of a particular size, then the dataset is determined to be dense; otherwise, the dataset is sparse. As a result, different stages of the pipeline may be selected for execution based on this determination.

An example of dense data (high-resolution data) is historical US Options Price Reporting Authority (OPRA) data, which contains tens of billions of daily events. An example of sparse data is treasury data where yields on maturities that lie between the on-the-run treasuries aren't available and are generated by interpolation.

As indicated herein, time series data can be ingested into the TDAS 110 from external sources, e.g., using provided data connectors. To begin analysis, an analyst can find the data by browsing a set of datasets in a catalog, or by searching for data. Once the data is located, it can be used in an interactive development notebook. Through such a notebook, a managed analytics cluster can be launched to run analysis at scale, using the crafted financial time series data pipeline to carry out time-series analysis.

The time series data pipeline establishes a multi-stage workflow that can be reused. The pipeline may utilize any of a potentially large number of analytic functions (of a library) that can be applied at various stages of the pipeline. Further, an analyst can integrate their own analytics or open-source libraries to the pipeline. As shown, the pipeline workflow supports analysis for both dense and sparse data.

In some embodiments, the pipeline is implemented to run in the interactive notebook and provide a single framework to move research from analysis into production. Analysts can run their analysis by integrating/referencing these analytic functions in their code in the notebook. Once the analyst's research is completed, the same notebooks can be deployed in a production environment, e.g., by obtaining the code and/or libraries and deploying them in a desired environment. Moreover, new changes to the production notebook can be easily deployed. Further, reproducibility is supported through the bitemporal versioning of input data, output data, and parameters used in the analysis. The result datasets of an analysis can be saved into a new, derived datasets for future reference.

In some embodiments, the interactive notebook can be used to combine machine learning (ML) to the time-series pipeline without the need to setup any machine learning frameworks or infrastructure. For example, an analyst building a ML model that predicts whether to buy, sell, or hold a US equity stock, can use the provided analytic functions on the stock's historical time-series data to generate features such as average daily price, daily transaction volume, moving average, etc., and use them as inputs to a ML classification model for predictions, which may optionally be hosted by a machine learning service of the provider network.

As shown in FIG. 2, the time series data pipeline enables analysis from raw time series events 220 into features to support decision making The pipeline includes analytic functions for dense data. For example, hedge fund trading in US equity options may use months or years of dense historical data from OPRA (Options Price Reporting Authority) which contains billions of events daily for developing trading strategies.

The pipeline also supports analysis for sparse data with small number of events that require interpolation to generate more sample data points before any analytics can be applied. For example, a fixed income analyst may calculate yield on a 1.5 year bond using the available yields for bonds with other maturities.

The illustrated time series data pipeline implements a set of stages 210 that can be configured by users. The stages of analysis may change depending on the input raw time series data being dense or sparse—e.g., logical code can be run before use of the pipeline (or as an initial step of the pipeline) to identify whether the dataset is dense or sparse, and then cause the corresponding pipeline to be run. Users can even customize the pipeline at any stage with their own functions and/or third-party libraries (e.g., TA-Lib).

For dense data, in the first collection stage ("collect bars" 230), the pipeline may include functions to collect time series events into homogeneous intervals (or groupings) called time bars. A time bar is a collection of events for a single time-interval. For example, for a given day of trading prices for a particular stock from a US Trades and Quotes (TAQ) dataset, analytic functions can be used to collect 1-min time bars, where each bar is the collection of trading price events that occurred for each interval of the day; sixty time bars for every hour of one-minute time bars, or twelve bars if they are five-minute bars.

In some embodiments, the collect bars stage 230 is applicable to processing dense event data. The objective of this stage is to collect the series of events that arrive at an irregular frequency into uniform intervals called bars or time bars. Users can perform collection with their own functions or provided functions to calculate bars, such as the following functions:

Time bars—Collect events at fixed time intervals. For example, for a given day of trading prices for a stock from the US Equities NYSE TAQ dataset, provided analytical functions can be used to collect one-minute time bars, where each bar is the collection of trading price events that occurred for each interval of the day.

Tick bars—Collect events at each predefined number of events (for example, collect events at one bar every 100 events).

Volume bars—Collect events after a predefined number of security units have been exchanged.

Market value bars—Collect events after a predefined market value is exchanged.

In some embodiments, the collection of events into bars may by performed by an analytics engine (e.g., run by the analytics cluster), and may result in a complex data structure such as a complex table, which may include a record for each bar, and may have one or more values of standard data types (e.g., a begin time, an end time) and possibly a value that itself is a table (storing the events in that bar); however, many other data structures may be utilized that are known to those of skill in the art.

The next stage of the pipeline is a summarize stage 235, where functions may be used to calculate summaries of the bars and calculate a single data point (or set of data points) from multiple events collected in an interval. For example, for transaction cost analysis, an asset manager may use US equities TAQ data to compare the execution price of their orders over a period of multiple days to the volume weighted average price (VWAP) summarized over the same time period by applying collect functions to intervals and summarize into hourly summaries and then calculate VWAP by bringing their own analytic function.

In some embodiments, the objective of this stage is to take collected data in bars from the previous stage(s) and summarize them. For example, an asset manager can use US Equities NYSE TAQ event data to summarize those events into one-minute bars. Users in some embodiments can derive Volume Weighted Average Price (VWAP) summaries, a trading benchmark used to calculate the average price a security has traded at throughout the day, based on both volume and price. In some embodiments, users can perform their own summaries or use the analytical functions provided for this stage to calculate OHLC (open, high, low, close) prices, Linear regression by seconds/days, Weighted linear regression by seconds/days, Simple linear regression, Simple weighted linear regression, Total Volume, etc.

In the case of sparse data, where the events might not be sufficient to collect or summarize, an analyst can bring their own analytics to generate bars at stage 225 to prepare summaries For example, if a Hedge fund is trading Options on a particular stock, and wants to value a 5 year option on the stock at a given strike price based on available data for corresponding options contracts that have maturities from 1 week to 2 years, they may use a generator that will take the raw historical events from OPRA to calculate Implied Volatility which can be used as an input to Black-Scholes analytic function to calculate the price of the five-year option for the stock.

Sparse data may be used to generate scenarios as part of stage 225. For example, given the official close price of a stock for today, a hedge fund analyst may want to use time-series data from OPRA to calculate how well a call option would perform given a spot price moving in certain directions. In this case, they may use a Black Scholes pricing model function to calculate the option price for multiple scenarios, where each scenario has a different spot price that is based on +x% or −x% of the official close price for today; where x is −1, −5, 1, 5, etc. This spot price is then used as an input into Black Scholes options pricing model along with other inputs.

For further detail on stage 225, this stage may be applicable to sparse data where input events may not be enough to collect into bars. The objective of this stage is to generate bars that can serve as input to next stage. Users can bring their own functions to generate bars. For example, a fixed income analyst can generate bars for prices on a bond that had no trades during a time interval by interpolating from available prices for the same bond during another time interval. Users may also generate scenarios on existing datasets to assess the impact of a trading strategy, such as shifting the trading price by a percentage and generating a new time series dataset for a what-if analysis. This technique is used often in options analysis where the spot price is shifted by a percentage to create new datasets from an existing dataset.

Once the generate bars or summarize bars stage 225 completes, in the next stage, the data produced from the previous stage may be "filled out" to form evenly spaced intervals and/or filtered at "fill/filter" stage 240. This can be the insertion of a NaN value, or a value from a previous bar can be applied, or an analytic can be used. The resulting data set can be filled or filtered out based on a trading holiday and exchange hours calendar, or another data set can be joined to create a kernel data set. Embodiments may provide a default fill function, and a New York Stock Exchange (NYSE) Business calendar (e.g., for use in filtering out data not from within the active hours of the NYSE), and/or users can extend both with their own.

For further detail, the data produced in the previous stage could have missing bars where no data was collected or contain data that should not be used in the next stage. The objective of this stage, in some embodiments, is to prepare a dataset with evenly spaced intervals and filter out any data outside the desired time window. For example, if no activity occurred in a period of time, no data is summarized. This means that missing (empty) summary bars may need to be added to the data to account for periods in which no data was collected. This filling can be a simple insertion of NaN (Not a Number) values or could take into account what the empty bar represents and use an appropriate value. In some embodiments, the framework provides a default fill function. The resulting dataset is filtered out based on a trading holiday and exchange hours calendar. For example, some embodiments provide the NYSE business calendar, or users may use their own. The prepared dataset of features is now ready for the next stage.

Finally, in the last analytics stage 245, another set of analytic functions can be applied that operate on the kernel data set. For example, at this stage, a prepared dataset of features is ready for application of technical and statistical indicators. Users can bring their own indicator functions or choose one of the provided functions for this stage, such as moving average, converge/diverge (MACD), Ichimoku, relative strength indicator (RSI), commodity channel index (CCI), etc. The output of this stage can be an input to the user's analytical functions, or a summary statistic that is a response to a business problem defined at the beginning of the analysis.

Figure 3:
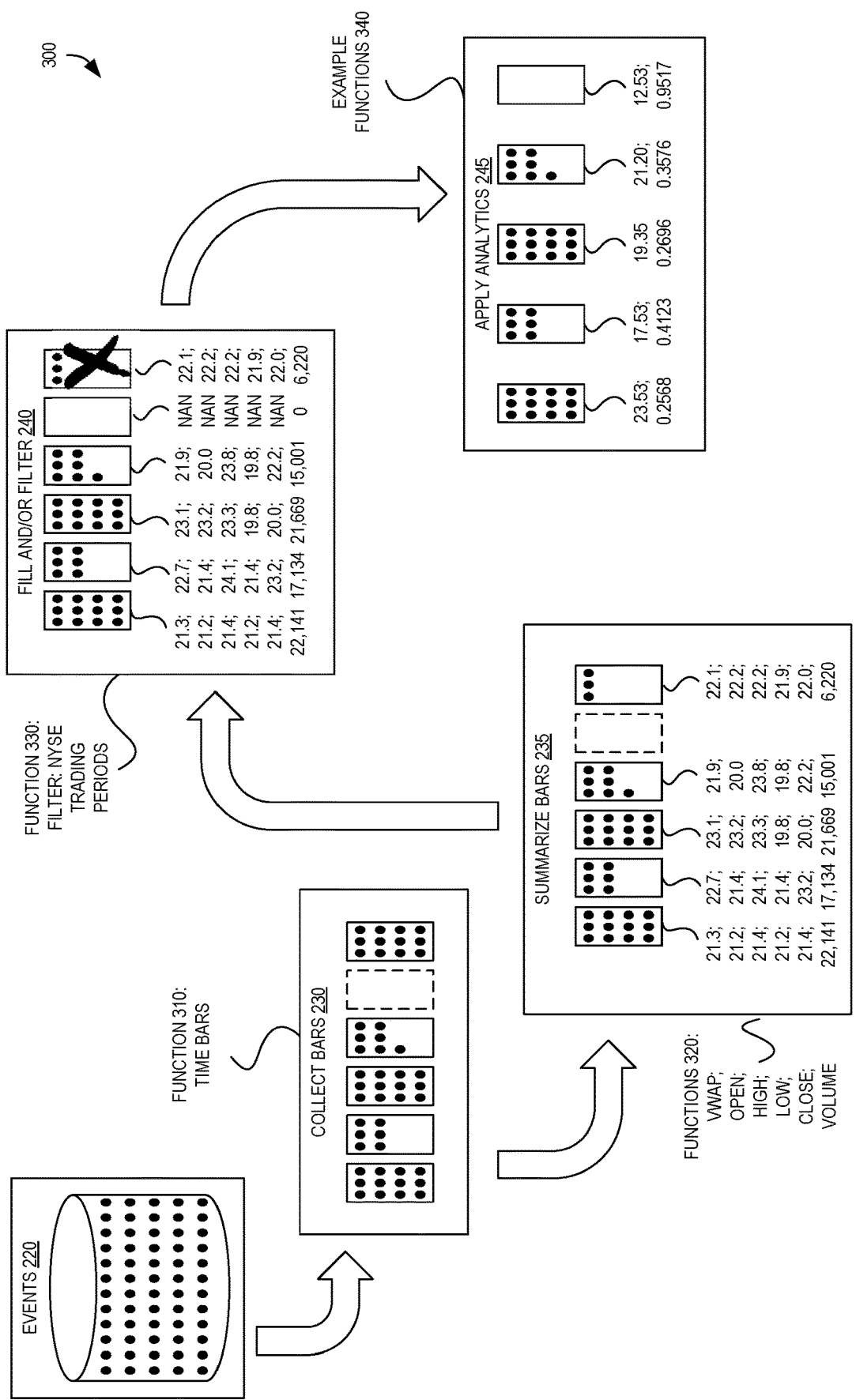
FIG. 3 is a diagram presenting a high-level visual overview of the operations of a time series analysis pipeline that can be configured by users in some embodiments.

For a more visual example, FIG. 3 presents a high-level visual overview of the operations 300 of a time series data pipeline that can be configured by users in some embodiments. In this simple example, a set of events 220 of a dataset selected by the user for use are shown as dots, where each event may include data (e.g., an equity symbol, a price value, a trade type, etc.) associated with a particular time value (e.g., "2021-03-10 05:24:00" or the like). The user may configure a first collect bars 230 stage to include the use of a "time bars" function 310 to place ones of the events into different bars, or groupings, according to some user-defined interval—e.g., one-minute bars, two-minute bars, five-minute bars, ten-minute bars, or the like. In this example, the bars have different numbers of events within them. In this example, a time period that should exist within a time range of interest may not have any events, and thus, in some embodiments a bar for this time period is not generated at this stage, as reflected by the dashed outline of a bar.

The user may configure a summarize bars stage 235 to create summary values for each of the bars—here, the user may select functions 320 to compute VWAP, open/high/low/close prices, and total volume. As shown, these summary values (or "summary statistics") are shown in correspondence to their associated bars—e.g., a first bar may have a VWAP of 21.3, an open of 21.2, a high of 21.4, a low of 21.2, a close of 21.4, and a total volume (e.g., of traded shares within the bar) of 22,141; other bars similarly have associated summary statistics as well.

The user may also configure a fill and filter stage 240 (in some embodiments, using either one or more fill functions alone, or one or more filter functions alone, or both fill and filter functions) to, for example, remove data (e.g., summary statistics and bars) of bars that do not occur within a period of time in which the NYSE is actively trading; in this example, one such bar (and corresponding summary statistics) is removed per the application of a NYSE trading periods function 330 is that removes data corresponding to time periods outside of the NYSE active trading time periods, which is illustrated in this figure via the overlay with an "X". As another example, a "fill" function may be used to generate data structures corresponding to time periods/windows that do not currently exist (e.g., within a user-defined range of times provided as an argument to the function)—here, a data structure for an "empty" bar may be created, and optionally summary statistics may be generated for the empty bar, such as NaN (Not a Number) or "0" or the like (selected depending upon the particular type of statistic).

Next, the user may configure an analytics stage 245 to include the use of one or more functions 340 provided by the framework (or provided by the user, etc.), which generates two values for each bar. Note, however, that these values are simply examples for the sake of understanding and thus, many different types and/or amounts of values may be generated using one or multiple functions from one or a variety of sources.

In some embodiments, a large number of analytics stage functions may be provided in a library of the framework for the user's use, which may include one or more technical functions such as ones for computing Acceleration Bands (ABANDS), Accumulation/Distribution, Average Directional Movement Index indicators (ADX), Moving Average Converge Diverge (MACD) indicator, Moving Average Converge Diverge histogram, Aroon Down Indicator, Aroon Oscillator, Aroon Up Indicator, Average true range, Bollinger Bands, Realized Correlation Matrix, Realized Volatility, Realized Volatility Spread, Relative Strength Index, Ultimate Oscillator, Exponential Moving Average, Fast Stochastic Oscillator, Ichimoku indicator, Kama Indicator, Keltner Indicator, Linear weighted moving average, Max indictor, Money Flow Index (MFI) indicator, Midpoint indicator, Mid-price indicator, Minimum Indicator, Minimum Maximum Indicator, Momentum Indicator, Rate of Change, Rate of Change Rate, Rate of Change Percentage, Price rate of change, Wilder Smoothing Indicator, Chande Momentum Indicator (CMO), Commodity Channel Index, Double exponential moving average, Normalized Average True Range, Negative Directional Indicator, On-balance volume, Pairwise realized correlation, Percentage price oscillator, Positive Directional Indicator, Price Channel Indicator, Volume Price Trend, Parabolic SAR indicator, Stochastic Oscillator, Standard deviation indicator, True range indicator, Triple Exponential moving average, Will R Indicator, etc. However, various embodiments may include none, some, or all of these functions, include other functions, etc., and thus these particular functions may or may not be used in various embodiments. Moreover, in some embodiments users may use their own custom functions and/or bring and use a library of functions (e.g., an open-source analytics library). Thus, various types (or combinations) of functions may be used in one or multiple stages of a pipeline.

As described herein, users may use an interactive development notebook to configure time series analysis pipelines using the framework disclosed herein. It is to be appreciated that a wide variety of different time series analysis pipelines can be configured for a wide variety of purposes; however, several examples regarding financial time series analysis are presented throughout this specification.

As one example of a configured time series analysis pipeline, a hedge fund trading in US equity options may want to use months or years of historical data from Options Price Reporting Authority (OPRA)—that contains billions of events daily—to run correlation analysis for developing a strategy that identifies arbitrage opportunities. Thus, the used functions could include use of (a) collect bars stage 230 function to place raw OPRA events into 1 min bars, (b) summarize stage 235 functions—e.g., for each bar of collected trades, compute the High, Low, Open, Close summaries, (c) fill and filter stage 240 functions to prepare Kernel dataset, e.g., by filling empty bars with NaN values to create evenly spaced intervals, and to filter out bars that do not occur within the business hours and days of the exchange, and (d) an analytics stage 245 correlation function to look for options that are negatively correlated to their option price.

As another example, a bank may want to use their transactions data for fraud detection, and thus may use (a) collect bars stage 230 functions to collect bars over different intervals, optionally functions in the summarize bars stage 235 and fill/filter stages 240 (e.g., may keep these stages empty) and then (b) a custom (i.e., user-defined "bring your own" analytic) function in the analytics stage 245 where the bars are fed into the bank's own summarizer analytic function to evaluate if a bar is representative of fraudulent or normal behavior, and may further implement a calculation/analytic on the result.

As a further example, an insurance firm may use end of day index and index options data to identity hedging opportunities for their annuity products that combine insurance and investment. The insurance firm would like to link the annuity to an index that is cheap to hedge. Thus, the used functions could include use of an (a) summarize bars function to create a summary of returns on all indices and at the money options, a (b) fill & filter function to prepare a kernel dataset, e.g., to fill empty bars with NaN values to create evenly spaced intervals, filter bars that occur within the business hours and days of the exchange, and (c) an analytics function to perform a correlation analysis via a correlation function to identify all of the indices whose returns are strongly correlated to their at the money options, and then use returns to identify those indices whose options are cheapest and offer the best protection against the index rising (and hence payout).

Further, a broker dealer may price products such as structured notes by taking time-series of historical prices of liquid notes of their competitors and additional market data. Thus, the used functions could include use of a (a) collect bars function to generate groupings of 5 minute intervals on historical prices, a (b) summarize bars function to create 5 minute summaries, (c) fill & filter functions to prepare a kernel dataset via a function to fill empty bars with NaN values to create evenly spaced intervals, and a function to filter bars that occur within the business hours and days of the exchange, and a (d) custom analytics function implementing (or referencing) the broker dealer's structured notes pricing library to price notes historically. The user could use this information to determine whether they could offer notes cheaper to their competitors, and what would that look like over a historical time period.

Finally, for regulatory reporting of positions taken on every security, a broker dealer with historical positions time series data can use the TDAS 110, such as through use of (a) a collect bars stage function to collect bars grouped by security, (b) a summarize bars stage function for aggregation of total position value per security, (c) fill & filter stage functions to prepare a kernel dataset via a function to fill empty bars with NaN values to create evenly spaced intervals and a function to filter bars that occur within the business hours and days of the exchange, and (d) a analytics stage user-specified analytic function to run regulatory calculations on the aggregate totals.

Example user interfaces showing aspects of an interactive development notebook for configuring such pipelines, according to some embodiments, are shown in the following FIGS. 4-9. This example use case shows how a dataset with dense raw time series events is transformed through the stages of the time series framework. The input dataset used in this example is similar to the US Equities Trades & Quotes (TAQ) data with a three-month history (Oct. 01, 2019 to Dec. 01, 2019) for a stock traded under the symbol AMZN. The code and the output shown in the example notebook interfaces in these figures demonstrate the stages that process the raw events and calculate Bollinger Bands. Although the analysis runs on the full dataset, for the purposes of this example, the screenshots only show a handful of events as of Oct. 01, 2019 at market open at 9:30 AM to follow the output easily.

FIG. 4 is a diagram illustrating an exemplary user interface presented to a user via an interactive development notebook for configuring a dataset view for pipeline construction and analysis according to some embodiments. This user interface (and subsequent user interfaces) illustrated may include various portions, such as "live code" portions (shown here as 400, 405, 415) where a user may enter/edit code, "live results" portions (shown here as 420) that may provide semi-real-time result data (generated via code from ones of the live code portions, as executed and returned by the TDAS 110, and provided back within a short period of time such as fractions of a second to potentially a few seconds), and descriptive portions providing guidance to the user as to how the pipeline should be configured. In this example, a first code portion 400 allows a user to start and connect to an analytics cluster 152. If no running cluster is found, a cluster is created. Next, via code portion 405, the user may initialize the dataset and data view identifiers, which may be obtained via other user interfaces provided by the TDAS 110, such as a dataset exploration page. Via code portion 415, the user may read the data view into a data structure, such as a Spark DataFrame. The data view now loaded into the DataFrame contains raw data events, and the DataFrame is filtered on the timestamp field, though the data view may also be filtered again (non-illustrated), e.g., to only include a subset of these fields (e.g., the ticker, event-type, datetime, price, quantity, exchange, and conditions fields). Per a printSchema method invocation (tDF.printSchema()), the live result 420 portion is updated to show the schema.

FIG. 5 is a diagram illustrating an exemplary user interface presented to a user via an interactive development notebook for configuring a collect bars stage of a time series analysis pipeline according to some embodiments. In live code section 500, the user may configure the collect bars stage to create time bars by calling a provided function of the framework—create_time_bars—which in this case is configured to collects raw data events into one-minute time bars. In the live results section 510, the "window" represents the one-minute time interval for the bar, while the "activity_count" shows the number of events collected in each bar. The data events collected inside the bar are not shown.

FIG. 6 is a diagram illustrating an exemplary user interface presented to a user via an interactive development notebook for configuring a summarize bars stage of a time series analysis pipeline according to some embodiments. In the Summarize Bars stage, the framework provided summarize functions are applied in the live code section 600 to calculate one-minute summaries of events collected in bars. Summaries are created for two-point standard deviation ("STD"), Volume Weighted Average Price, and open(first), high, low, and close(last) prices (OHLC), as well as the total volume. The live results section 610 now includes columns for these function results (or summary statistics)—the four OHLC values, the volume, the VWAP, and the STD.

FIG. 7 is a diagram illustrating an exemplary user interface presented to a user via an interactive development notebook for configuring a fill and filter stage of a time series analysis pipeline according to some embodiments. In this example, the live code section 700 shows the user configuring the stage to call the framework-provided time_bar_fill_and_filter function to filter the resulting dataset according to an exchange trading calendar, yielding live result section 710. We also assume that the user may create another dataset of features (via live code section 720) by simplifying the schema to make it easier to use in the next stage—e.g., to break the "window" column into "start" and "end" columns, to split the OHLC column into its individual components, etc. The result is not shown in this example.

FIG. 8 is a diagram illustrating an exemplary user interface presented to a user via an interactive development notebook for configuring an analytics stage of a time series analysis pipeline according to some embodiments. In this example, framework provided Bollinger Bands function is applied by the user on the features dataset in live code section 800—here, the tenor window to perform the calculation is set to "15" by the user, which means that the calculation is applied when fifteen data events are available. Because each event corresponds to a one-minute summary bar in the features dataset, the resulting dataset starts from timestamp 09:45 (see the illustrated end column in live results section 810, together with the generated Bollinger Band values).

Figure 9:
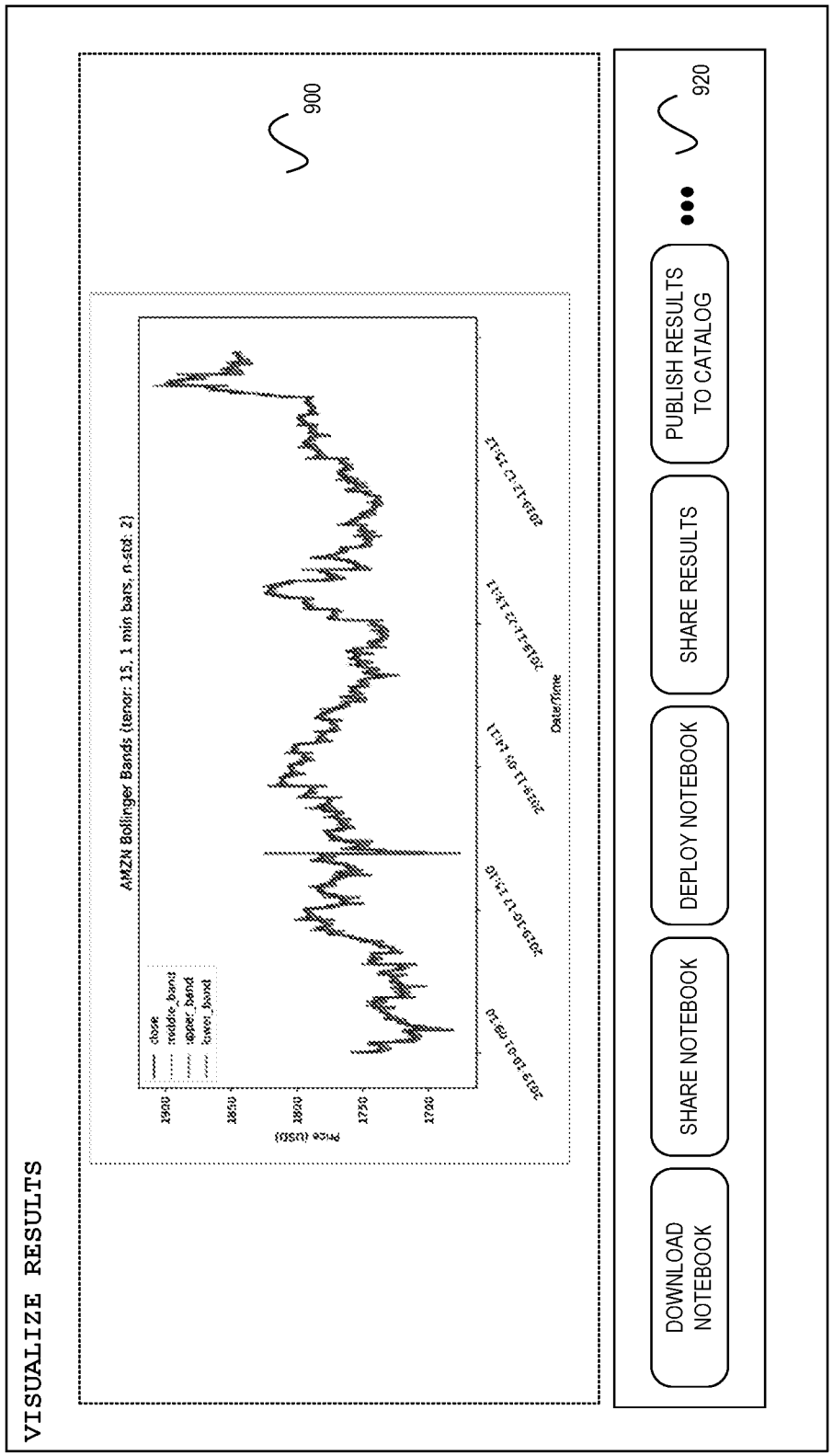
FIG. 9 is a diagram illustrating an exemplary user interface presented to a user via an interactive development notebook for visualizing results and utilizing a pipeline notebook for a time series analysis pipeline according to some embodiments.

FIG. 9 is a diagram illustrating an exemplary user interface presented to a user via an interactive development notebook for visualizing results and utilizing a pipeline notebook for a time series analysis pipeline according to some embodiments. With the results of the analytics stage, the user can perform a variety of actions. One such example task shown is to plot the output into a chart (e.g., using a graphics library/application such as the Python plotting library matplotlib)—as shown at 900, the chart shows Bollinger Bands for the entire three-month history for AMZN.

The user interfaces may further allow users to perform other actions involving the configured pipeline and/or results, e.g., via section 920 of the interface. For example, some embodiments provide a user interface element (e.g., a button such as the illustrated "download notebook" button) to allow the user to download code for the pipeline (optionally with the library of functions) or the entire notebook, or may provide a user interface element to share the notebook (or pipeline) with other users (of the provider network, of the user's organization, etc.).

In some embodiments, the user may be presented a user interface element (e.g., a "deploy notebook" button) allowing the user to deploy the pipeline/notebook for use, which could be within/by the TDAS 110, via a serverless function provided by an on-demand code execution service, via an application executed by one or more compute instances provided by a hardware virtualization service, via an analytics service, or the like. Thus, the user (or another user, application, system, etc.) could run the pipeline with a particular dataset view (e.g., a user-indicated view, or a most current view, etc.) and obtain the results of the pipeline's execution, whether visually, via an output file or message, etc. For example, an application could call the pipeline that is configured to generate features, and these outputted features could be obtained and then provided as inputs to a machine learning model (possibly hosted by a machine learning hosting service of the provider network) to generate a prediction/inference—e.g., whether to buy or sell a stock, for example.

In some embodiments the user may be presented a user interface element (e.g., a "share results" button) allowing the user to share the results of a pipeline, e.g., by sending results to one or more storage locations or other destinations, by granting other users permission to access stored results, or the like. Additionally, or alternatively, the user may be presented a user interface element (e.g., a "publish results" button) allowing the user to publish the results (e.g., as a dataset) back into the data catalog service, to allow other users to use these results in yet another pipeline (or to query or analyze these results via another service or application). Thus, the generation of a pipeline using a dataset can act as a flywheel to lead to another dataset that can be used to generate other pipelines, and so on.

Figure 10:
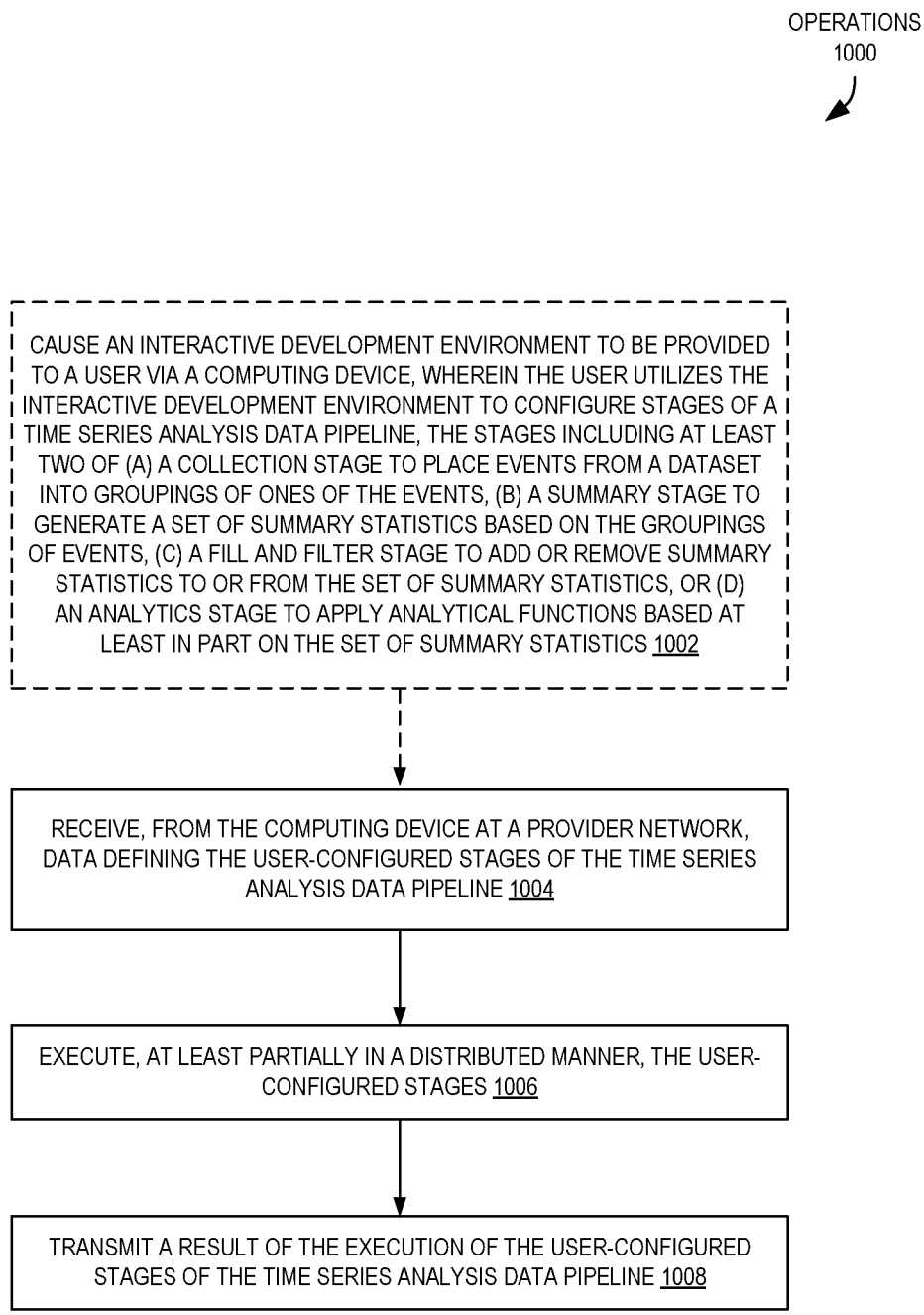
FIG. 10 is a flow diagram illustrating operations of a method for time series analysis using a service-provided framework according to some embodiments.

FIG. 10 is a flow diagram illustrating operations 1000 of a method for time series analysis using a service-provided framework according to some embodiments. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1000 are performed by the TDAS 110 of the other figures.

The operations 1000 optionally include, at block 1002, causing an interactive development environment to be provided via a computing device, wherein the interactive development environment is configured to receive user input to configure stages of a time series analysis data pipeline, the stages including at least two of: a collection stage to place events from a dataset into groupings of ones of the events, a summary stage to generate a set of summary statistics based on the groupings of events, a fill and filter stage to add or remove summary statistics to or from the set of summary statistics, or an analytics stage to apply analytical functions based at least in part on the set of summary statistics.

The operations 1000 include, at block 1004, receiving, from the computing device at a provider network, data defining the user-configured stages of the time series analysis data pipeline; and at block 1006, executing, at least partially in a distributed manner, the user-configured stages. The operations 1000 further include transmitting, at block 1008, a result of the executing of the user-configured stages of the time series analysis data pipeline (e.g., to the computing device, to a storage location such as an object storage bucket/folder of a storage service of the provider network, etc.).

In some embodiments, the operations 1000 further include selecting the stages of the time series analysis data pipeline based on a determination that the dataset satisfies a density condition, wherein the selected stages include the collection stage, the summary stage, the fill and filter stage, and the analytics stage.

In some embodiments, the collection stage includes a call to utilize at least one of: a time bar function that distributes events from the dataset into time-window based groupings, a tick bar function that distributes events from the dataset into tick-based groupings, a volume bar function that distributes events from the dataset into volume-based groupings, or a market value bar function that distributes events from the dataset into market value-based groupings.

In some embodiments, the summary stage includes a call to utilize at least one of: an open, high, low, and/or close function that identifies an opening value of a commodity within each grouping, a high value of the commodity within each grouping, a low value of the commodity within each grouping, and/or a closing value of the commodity within each grouping; a volume weighted average price (VWAP) function; an unweighted or weighted linear regression function that generates components of a formula indicative of value change of the commodity within each grouping; or a total volume function that generates a total volume value indicating a total amount of activity within each grouping.

In some embodiments, the fill and filter stage includes a call to utilize at least one of: a function to add at least a summary statistic to the set of summary statistics for any groupings determined to be missing or empty based on a criterium; or a function to remove at least a summary statistic from the set of summary statistics based on an analysis of time values associated with the groupings.

In some embodiments, at least one of the stages includes use of a user-provided function. In some embodiments, receiving the data defining the user-configured stages of the time series analysis data pipeline includes receiving, at the provider network, a first message with code for a first stage; executing, at least partially in a distributed manner, the user-configured stages includes causing a cluster of compute instances of the provider network to execute the code for the first stage; and the operations 1000 further include transmitting a result associated with the execution of the first stage to the computing device, causing the interactive development environment to present the result to the user.

In some embodiments, the operations 1000 further include deploying the time series analysis data pipeline as a function or application within the provider network.

In some embodiments, the operations 1000 further include receiving a request originated by an application to execute the time series analysis data pipeline; executing the time series analysis data pipeline; and transmitting a result of the executing of the time series analysis data pipeline to the application or to a storage location.

In some embodiments, the interactive development environment comprises a web-based interactive development notebook application executed by a browser of the computing device and served at least in part by a compute instance of the provider network, and wherein the executing of at least one of the stages of the time series analysis data pipeline is performed by a cluster of compute instances of the provider network.

In some embodiments, the cluster of compute instances, to execute the at least one of the stages, utilize a distributed processing analytics engine.

Figure 11:
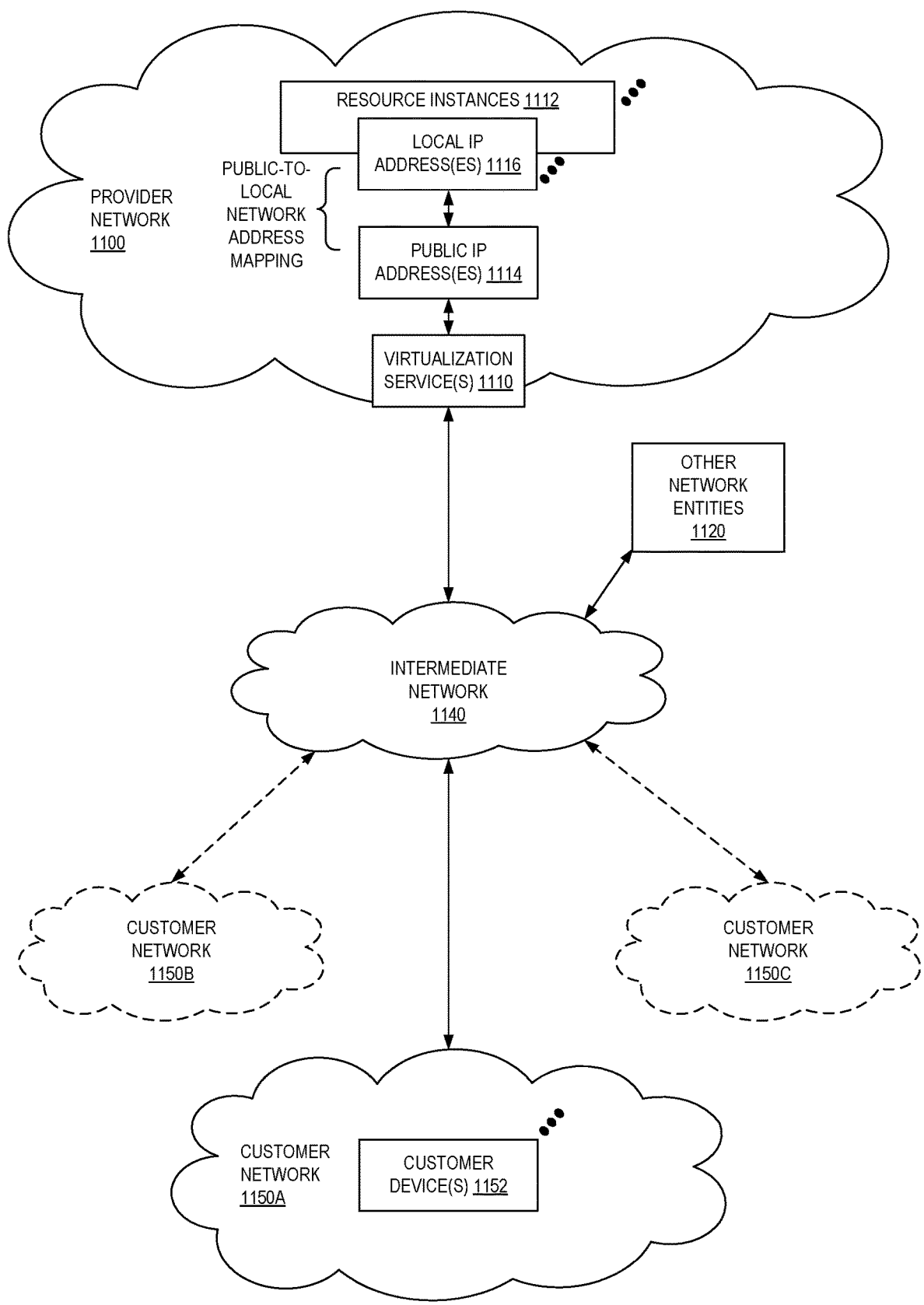
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more customer networks 1150A-1150C (may also be referred to as client networks) including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
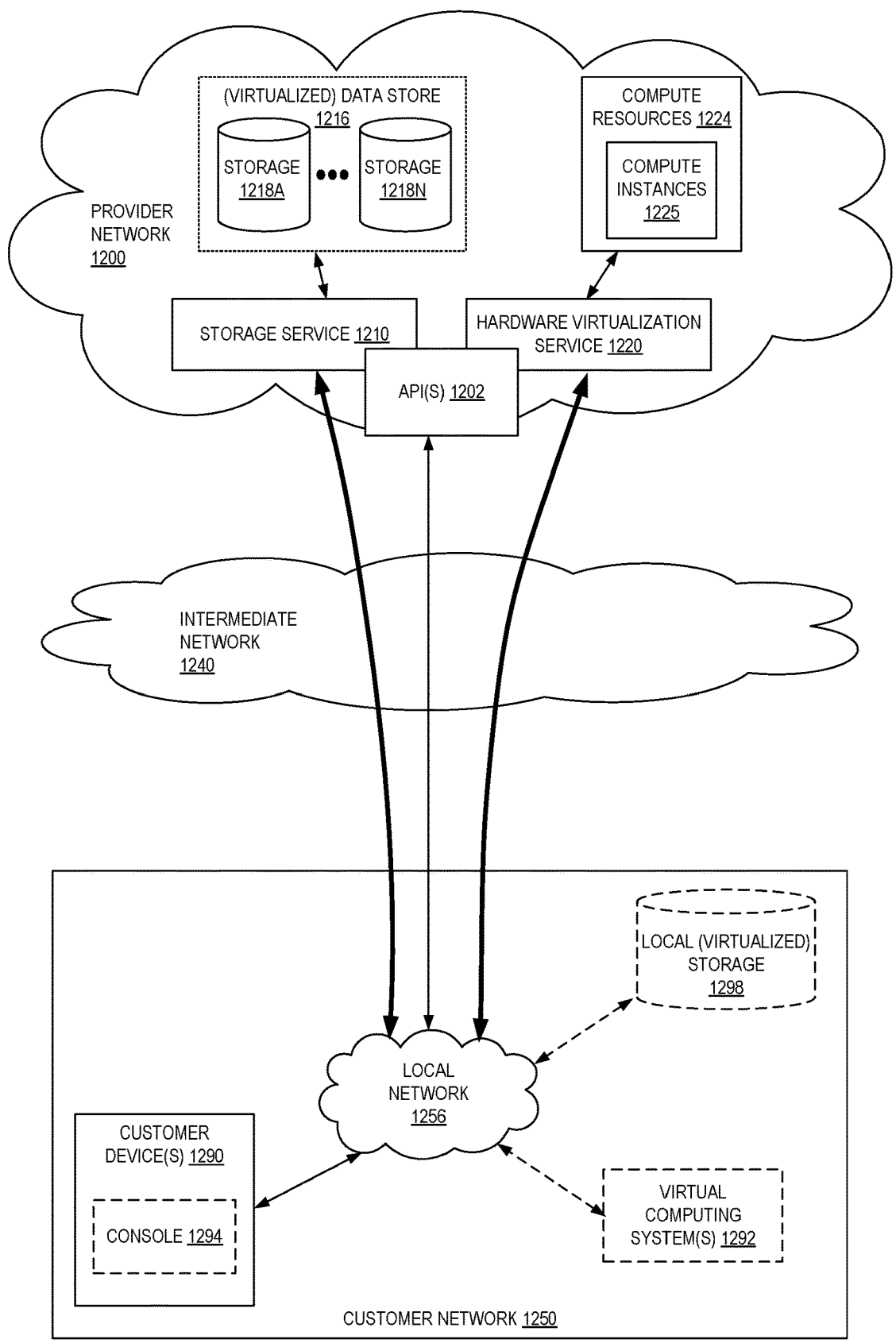
FIG. 12 is a block diagram of an example provider network that provides a storage service and a hardware virtualization service to customers according to some embodiments.

FIG. 12 is a block diagram of an example provider network environment that provides a storage service and a hardware virtualization service to customers, according to some embodiments. A hardware virtualization service 1220 provides multiple compute resources 1224 (e.g., compute instances 1225, such as VMs) to customers. The compute resources 1224 may, for example, be rented or leased to customers of a provider network 1200 (e.g., to a customer that implements a customer network 1250). Each computation resource 1224 may be provided with one or more local IP addresses. The provider network 1200 may be configured to route packets from the local IP addresses of the compute resources 1224 to public Internet destinations, and from public Internet sources to the local IP addresses of the compute resources 1224.

The provider network 1200 may provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some embodiments, the hardware virtualization service 1220 may provide one or more APIs 1202, for example a web services interface, via which the customer network 1250 may access functionality provided by the hardware virtualization service 1220, for example via a console 1294 (e.g., a web-based application, standalone application, mobile application, etc.) of a customer device 1290. In some embodiments, at the provider network 1200, each virtual computing system 1292 at the customer network 1250 may correspond to a computation resource 1224 that is leased, rented, or otherwise provided to the customer network 1250.

From an instance of the virtual computing system(s) 1292 and/or another customer device 1290 (e.g., via console 1294), the customer may access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some embodiments, a virtualized data store gateway (not shown) may be provided at the customer network 1250 that may locally cache at least some data, for example frequently accessed or critical data, and that may communicate with the storage service 1210 via one or more communications channels to upload new or modified data from a local cache so that the primary store of data (the virtualized data store 1216) is maintained. In some embodiments, a user, via the virtual computing system 1292 and/or on another customer device 1290, may mount and access virtual data store 1216 volumes via the storage service 1210 acting as a storage virtualization service, and these volumes may appear to the user as local (virtualized) storage 1298.

While not shown in FIG. 12, the virtualization service(s) may also be accessed from resource instances within the provider network 1200 via the API(s) 1202. For example, a customer, appliance service provider, or other entity may access a virtualization service from within a respective virtual network on the provider network 1200 via the API(s) 1202 to request allocation of one or more resource instances within the virtual network or within another virtual network.

Illustrative Systems

Figure 13:
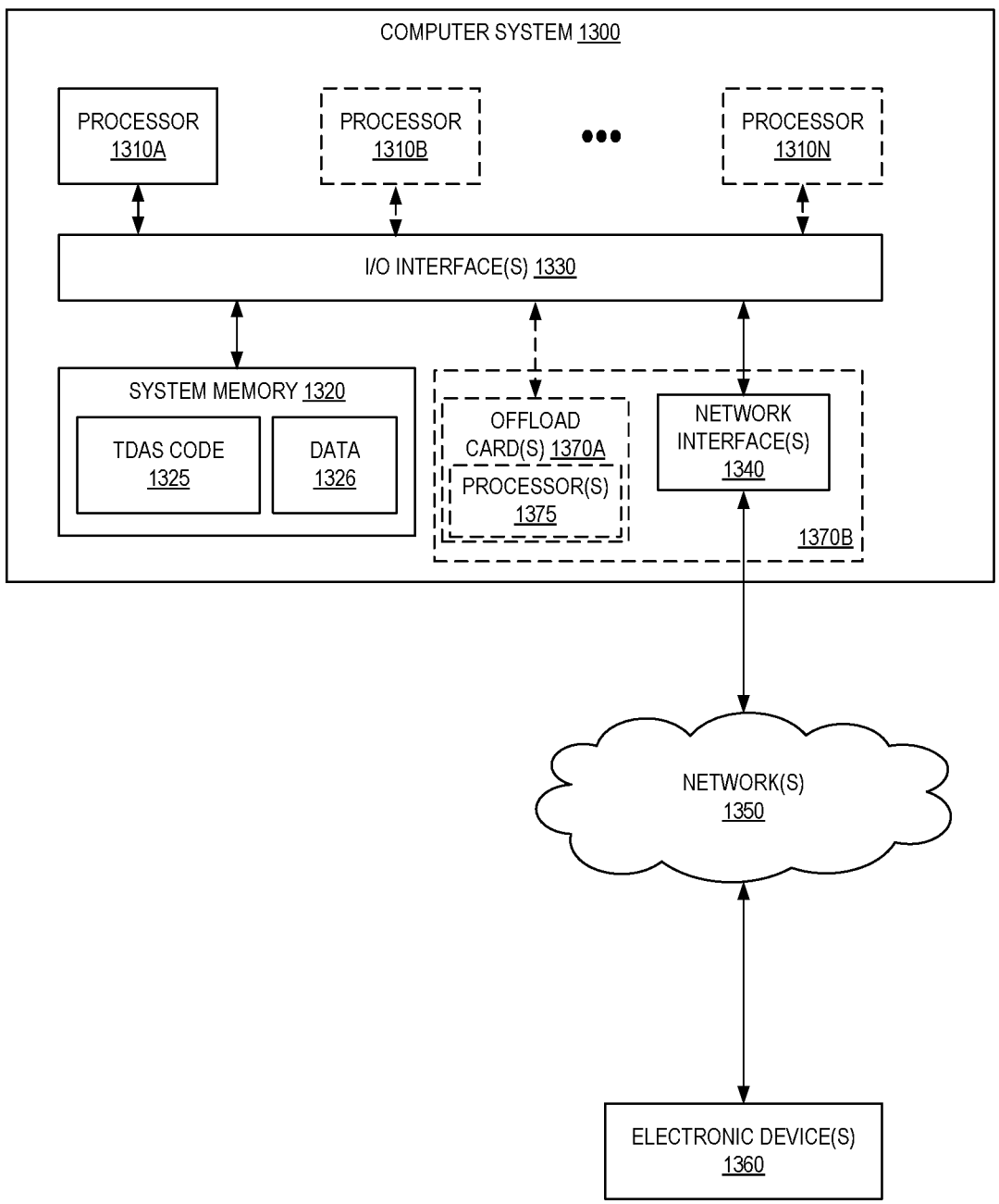
FIG. 13 is a block diagram illustrating an example computer system that may be used in some embodiments.

In some embodiments, a system that implements a portion or all of the techniques described herein may include a general-purpose computer system, such as the computer system 1300 illustrated in FIG. 13, that includes, or is configured to access, one or more computer-accessible media. In the illustrated embodiment, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various embodiments the computer system 1300 may include one computing device or any number of computing devices configured to work together as a single computer system 1300.

In various embodiments, the computer system 1300 may be a uniprocessor system including one processor 1310, or a multiprocessor system including several processors 1310 (e.g., two, four, eight, or another suitable number). The processor(s) 1310 may be any suitable processor(s) capable of executing instructions. For example, in various embodiments, the processor(s) 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 may commonly, but not necessarily, implement the same ISA.

The system memory 1320 may store instructions and data accessible by the processor(s) 1310. In various embodiments, the system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1320 as TDAS code 1325 (e.g., executable to implement, in whole or in part, the TDAS 110) and data 1326.

In one embodiment, the I/O interface 1330 may be configured to coordinate I/O traffic between the processor 1310, the system memory 1320, and any peripheral devices in the device, including the network interface 1340 and/or other peripheral interfaces (not shown). In some embodiments, the I/O interface 1330 may perform any necessary protocol, timing, or other data transformations to convert data signals from one component (e.g., the system memory 1320) into a format suitable for use by another component (e.g., the processor 1310). In some embodiments, the I/O interface 1330 may include support for devices attached through various types of peripheral buses, such as a variant of the Peripheral Component Interconnect (PCI) bus standard or the Universal Serial Bus (USB) standard, for example. In some embodiments, the function of the I/O interface 1330 may be split into two or more separate components, such as a north bridge and a south bridge, for example. Also, in some embodiments, some or all of the functionality of the I/O interface 1330, such as an interface to the system memory 1320, may be incorporated directly into the processor 1310.

The network interface 1340 may be configured to allow data to be exchanged between the computer system 1300 and other devices 1360 attached to a network or networks 1350, such as other computer systems or devices as illustrated in FIG. 1, for example. In various embodiments, the network interface 1340 may support communication via any suitable wired or wireless general data networks, such as types of Ethernet network, for example. Additionally, the network interface 1340 may support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some embodiments the offload card(s) 1370A or 1370B can perform compute instance management operations, such as pausing and/or un-pausing compute instances, launching and/or terminating compute instances, performing memory transfer/copying operations, etc. These management operations may, in some embodiments, be performed by the offload card(s) 1370A or 1370B in coordination with a hypervisor (e.g., upon a request from a hypervisor) that is executed by the other processors 1310A-1310N of the computer system 1300. However, in some embodiments the virtualization manager implemented by the offload card(s) 1370A or 1370B can accommodate requests from other entities (e.g., from compute instances themselves), and may not coordinate with (or service) any separate hypervisor.

In some embodiments, the system memory 1320 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include any non-transitory storage media or memory media such as magnetic or optical media, e.g., disk or DVD/CD coupled to the computer system 1300 via the I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of the computer system 1300 as the system memory 1320 or another type of memory. Further, a computer-accessible medium may include transmission media or signals such as electrical, electromagnetic, or digital signals, conveyed via a communication medium such as a network and/or a wireless link, such as may be implemented via the network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1218A-1218N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a time series data analysis service (TDAS) of a provider network, one or more messages indicating a request to begin configuring a time series analysis data pipeline via use of a view of a dataset;
   transmitting, by the TDAS to a computing device, data to cause an interactive development notebook to be provided via the computing device, wherein the interactive development notebook is configured to receive user input to configure stages of the time series analysis data pipeline, the stages including at least:
     a collection stage to place events from the dataset into groupings of ones of the events,
     a summary stage to generate a set of summary statistics based on the groupings of events,
     a fill and filter stage to add or remove summary statistics to or from the set of summary statistics, and
     an analytics stage to apply analytical functions based at least in part on the set of summary statistics;
   receiving, from the computing device at the TDAS, data defining the user-configured stages of the time series analysis data pipeline;

executing, at least partially in a distributed manner, the user-configured stages; and transmitting at least a portion of a result of the executing of the user-configured stages to the computing device or to a storage service of the provider network.

2. The computer-implemented method of claim 1, wherein the interactive development notebook comprises a web-based application executed by a browser of the computing device and served at least in part by a compute instance of the provider network, and wherein the executing of at least one of the stages of the time series analysis data pipeline is performed by a cluster of compute instances of the provider network that utilize a distributed processing analytics engine.

3. The computer-implemented method of claim 1, wherein at least a first one of the stages includes use of a user-provided function, and wherein at least a second one of the stages includes use of a function provided by a library of the TDAS.

4. A computer-implemented method comprising:
receiving, from a computing device at a service of a provider network, data defining user-configured stages of a time series analysis data pipeline, the stages including at least:
a collection stage to place events from a dataset into groupings of ones of the events,
a summary stage to generate a set of summary statistics based on the groupings of events, or a fill and filter stage to add or remove summary statistics to or from the set of summary statistics or to add or remove events to or from the groupings of events, and
an analytics stage to apply analytical functions based at least in part on the groupings of events or the set of summary statistics;
executing, at least partially in a distributed manner, the user-configured stages of the pipeline; and
transmitting a result of the executing of the user-configured stages of the pipeline.

5. The computer-implemented method of claim 4, further comprising:
causing an interactive development environment to be provided via the computing device, wherein the interactive development environment is configured to receive user input to configure the stages of the time series analysis data pipeline.

6. The computer-implemented method of claim 4, further comprising:
selecting stages of the time series analysis data pipeline for execution based on a determination that the dataset satisfies a density condition, wherein the selected stages include the collection stage, the summary stage, the fill and filter stage, and the analytics stage.

7. The computer-implemented method of claim 4, wherein the collection stage includes a call to utilize at least one of:
a time bar function that distributes events from the dataset into time-window based groupings;
a tick bar function that distributes events from the dataset into tick-based groupings;
a volume bar function that distributes events from the dataset into volume-based groupings; or
a market value bar function that distributes events from the dataset into market value-based groupings.

8. The computer-implemented method of claim 4, wherein the stages include the summary stage, and wherein the summary stage includes a call to utilize at least one of:

an open, high, low, and/or close function that identifies an opening value of a commodity within each grouping, a high value of the commodity within each grouping, a low value of the commodity within each grouping, and/or a closing value of the commodity within each grouping;
a volume weighted average price (VWAP) function;
an unweighted or weighted linear regression function that generates components of a formula indicative of value change of the commodity within each grouping; or
a total volume function that generates a total volume value indicating a total amount of activity within each grouping.

9. The computer-implemented method of claim 4, wherein the stages include the summary stage and the fill and filter stage, and wherein the fill and filter stage includes a call to utilize at least one of:
a function to add at least a summary statistic to the set of summary statistics for any groupings determined to be missing or empty based on a criterium; or
a function to remove at least a summary statistic from the set of summary statistics based on an analysis of time values associated with the groupings.

10. The computer-implemented method of claim 4, wherein at least one of the stages includes use of a user-provided function or library.

11. The computer-implemented method of claim 4, wherein:
receiving the data defining the user-configured stages of the time series analysis data pipeline includes receiving, at the provider network, a first message with code for a first stage;
executing, at least partially in a distributed manner, the user-configured stages includes causing a cluster of compute instances of the provider network to execute the code for the first stage; and
wherein the method further comprises transmitting a result associated with the execution of the first stage to the computing device to be presented.

12. The computer-implemented method of claim 4, further comprising:
deploying the time series analysis data pipeline as a function or application within the provider network.

13. The computer-implemented method of claim 4, further comprising:
receiving a request originated by an application to execute the time series analysis data pipeline;
executing the time series analysis data pipeline; and
transmitting a result of the executing of the time series analysis data pipeline to the application or to a storage location.

14. The computer-implemented method of claim 4, wherein the stages of the time series analysis data pipeline were configured via a web-based interactive development notebook application executed by a browser of the computing device and served at least in part by a compute instance of the provider network, and wherein the executing of at least one of the stages of the time series analysis data pipeline is performed by a cluster of compute instances of the provider network.

15. The computer-implemented method of claim 4, wherein the transmitting of the result of the executing of the user-configured stages of the pipeline comprises storing the result as a dataset.

16. A system comprising:
a first one or more electronic devices to implement a storage service in a multi-tenant provider network to store a dataset; and
a second one or more electronic devices to implement a time series data analysis service in the multi-tenant provider network, the time series data analysis service including instructions that upon execution cause the time series data analysis service to:
transmit data to cause an interactive development environment to be provided via a computing device, wherein the interactive development environment is configured to receive user input to configure stages of a time series analysis data pipeline, the stages including at least:
a collection stage to place events from the dataset into groupings of ones of the events,
a summary stage to generate a set of summary statistics based on the groupings of events, or a fill and filter stage to add or remove summary statistics to or from the set of summary statistics or to add or remove events to or from the groupings of events, and an analytics stage to apply analytical functions based at least in part on the groupings of events or the set of summary statistics;
receive, from the computing device at a provider network, data defining the user-configured stages of the time series analysis data pipeline; and
execute, at least partially in a distributed manner, the user-configured stages.

17. The system of claim 16, wherein:
to receive the data defining the user-configured stages of the time series analysis data pipeline the time series data analysis service is to receive a first message with code for a first stage;
to execute, at least partially in a distributed manner, the user-configured stages the time series data analysis service is to cause a cluster of compute instances of the provider network to execute the code for the first stage; and
wherein the time series data analysis service further includes instructions that when executed cause the time series data analysis service to transmit a result associated with the execution of the first stage to the computing device to cause the interactive development environment to present the result to the user.

18. The system of claim 16, wherein the time series data analysis service further includes instructions that when executed cause the time series data analysis service to deploy the time series analysis data pipeline as a function or application within the provider network.

19. The system of claim 16, wherein the time series data analysis service further includes instructions that when executed cause the time series data analysis service to:
receive a request originated by an application to execute the time series analysis data pipeline;
execute the time series analysis data pipeline; and
transmit a result of the executing of the time series analysis data pipeline to the application or to a storage location.

20. The system of claim 16, wherein the interactive development environment comprises a web-based interactive development notebook application executed by a browser of the computing device and served at least in part by a compute instance of the provider network, and wherein the executing of at least one of the stages of the time series analysis data pipeline is performed by a cluster of compute instances of the provider network.

* * * * *